(12) United States Patent
Mondal et al.

(10) Patent No.: US 10,970,847 B2
(45) Date of Patent: Apr. 6, 2021

(54) DOCUMENT BOUNDARY DETECTION USING DEEP LEARNING MODEL AND IMAGE PROCESSING ALGORITHMS

(71) Applicant: Adobe Inc., San Jose, CA (US)

(72) Inventors: Prasenjit Mondal, West Bengal (IN); Anuj Shara, Delhi (IN); Ankit Bal, Noida (IN); Deepanshu Arora, Delhi (IN); Siddharth Kumar, Gurgaon (IN)

(73) Assignee: Adobe Inc., San Jose, CA (US)

( * ) Notice: Subject to any disclaimer, the term of this patent is extended or adjusted under 35 U.S.C. 154(b) by 62 days.

(21) Appl. No.: 16/413,922

(22) Filed: May 16, 2019

(65) Prior Publication Data
US 2020/0364875 A1 Nov. 19, 2020

(51) Int. Cl.
*G06T 7/13* (2017.01)
*G06T 5/00* (2006.01)
*G06T 7/136* (2017.01)
*G06T 5/20* (2006.01)
*G06T 5/40* (2006.01)
*G06N 20/00* (2019.01)

(52) U.S. Cl.
CPC .............. *G06T 7/13* (2017.01); *G06N 20/00* (2019.01); *G06T 5/002* (2013.01); *G06T 5/20* (2013.01); *G06T 5/40* (2013.01); *G06T 7/136* (2017.01); *G06T 2207/20032* (2013.01); *G06T 2207/20061* (2013.01); *G06T 2207/20081* (2013.01); *G06T 2207/20084* (2013.01); *G06T 2207/30176* (2013.01)

(58) Field of Classification Search
CPC .. G06T 7/12; G06T 5/002; G06T 5/20; G06T 5/40; G06T 2207/30176; G06N 20/00
USPC ......................................... 382/155–159, 199
See application file for complete search history.

(56) References Cited

U.S. PATENT DOCUMENTS

| | | | |
|---|---|---|---|
| 9,483,834 B1 | 11/2016 | Gaiha et al. | |
| 2009/0175537 A1* | 7/2009 | Tribelhorn | G06K 9/3233 382/173 |
| 2018/0024974 A1* | 1/2018 | Welinder | G06T 7/194 715/229 |
| 2019/0163750 A1* | 5/2019 | Sage | G06F 16/93 |
| 2019/0164313 A1* | 5/2019 | Ma | G06K 9/6256 |
| 2019/0311227 A1* | 10/2019 | Kriegman | G06K 9/6273 |

FOREIGN PATENT DOCUMENTS

CN 110516257 A * 11/2019

* cited by examiner

*Primary Examiner* — Nirav G Patel
*Assistant Examiner* — Stephen M Brinich
(74) *Attorney, Agent, or Firm* — Finch & Maloney PLLC

(57) ABSTRACT

Techniques are disclosed for document boundary detection (BD) from an input image using a combination of deep learning model and image processing algorithms. Quadrilaterals approximating the document boundaries in the input image are determined and rated separately using both these approaches: deep leaning using convolutional neural network (CNN) and heuristics using image processing algorithms. Thereafter, the best rated quadrilateral is selected from the quadrilaterals obtained from both the approaches.

20 Claims, 25 Drawing Sheets

Input image

Quadrilateral

Final output

DOCUMENT BOUNDARY DETECTION USING DEEP LEARNING MODEL AND IMAGE PROCESSING ALGORITHMS

FIELD OF THE DISCLOSURE

This disclosure relates generally to the field of digital image processing, and more particularly, to techniques for document boundary detection (BD) using a deep learning model and image processing algorithms.

BACKGROUND

A variety of computing devices, including mobile devices such as smart phones, have integrated cameras or scanners that facilitate various digital imaging-based applications. Some such applications can convert images of physical documents into digital files, a technique commonly referred to as scanning. For instance, a user can photograph a document, creating a digital image of the document. The image can then be converted into a digital file representing a copy of the original physical document. This can include converting typed, handwritten, or printed text appearing in a scanned document or a photograph of the document into machine-encoded text. However, conventional techniques have a limited ability to automatically differentiate the boundary of the document from background clutter appearing beyond the edge of the page. As a result, the digital copy of the document may contain extraneous elements, which, for example, may appear as an uneven dark or black band surrounding the page. The user can manually remove the background elements to clarify the actual document boundary, but this requires additional steps. In some cases, the document may be off-center or at an angle, which presents further challenges to existing automatic boundary detection techniques. Accordingly, as will be further explained herein, automatic boundary detection is a difficult and computationally expensive problem, and existing solutions are inadequate. Therefore, complex and non-trivial issues associated with boundary detection remain due to the limitations of these existing techniques.

BRIEF DESCRIPTION OF THE DRAWINGS

The accompanying drawings are not intended to be drawn to scale.

DETAILED DESCRIPTION

Techniques are disclosed for document boundary detection (BD) from an input image using a combination of deep learning model and image processing algorithms. Quadrilaterals approximating the document boundaries in the input image are determined and rated separately using both these approaches: deep leaning using convolutional neural network (CNN) and heuristics using image processing algorithms. Thereafter, the best rated quadrilateral is selected from the quadrilaterals obtained from both the approaches.

Boundary detection is a process that includes, among other things, identifying the edges of a document in an image that may include a background beyond the edge of the document (in other words, the edges of the document are not necessarily coextensive with the edges of the image). For example, the document boundary can be identified by rating lines appearing in the image, which may be the edges of the document, and then finding a quadrilateral that fits the highest-rated lines on all sides of the document. The resulting quadrilateral represents the edges of the document. Once the edges of the document are identified, the background surrounding the document can be removed, preserving only the contents of the document. However, due to a wide range of document types, such as forms, receipts, color/non-color pages, documents in the presence of differently textured or colored backgrounds, etc., and due to a wide range of image quality and sizes, boundary detection is a challenging task in image processing. Furthermore, existing boundary detection techniques can require more memory and processing power than is typically available on many popular computing devices, such as smart phones and tablets, to achieve the same level of document boundary detection quality.

Figure 1:
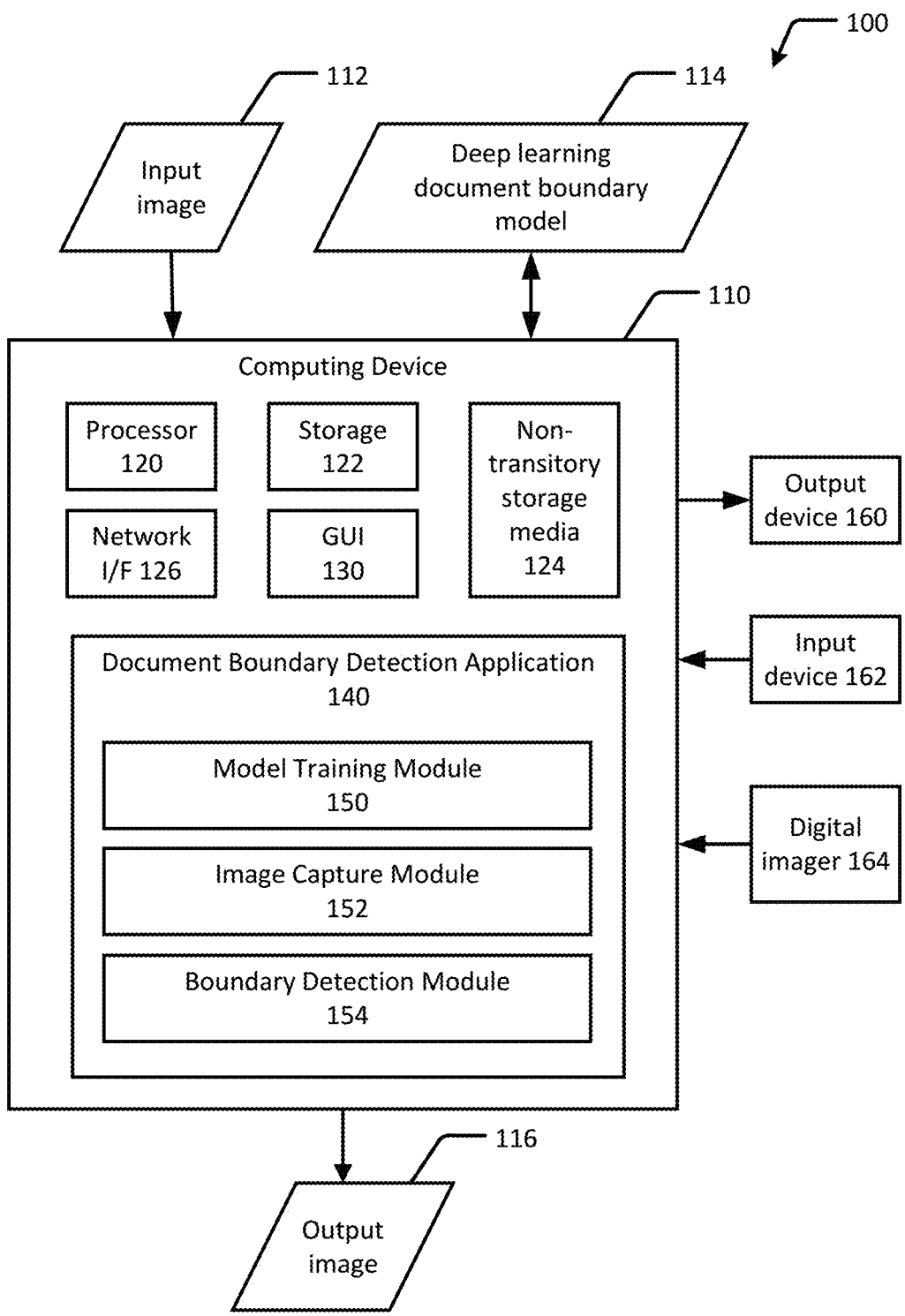
FIG. 1 shows an example system for document boundary detection using a deep learning model and image processing algorithms, in accordance with an embodiment of the present disclosure.

FIG. 1 shows an example system 100 for document boundary detection using a deep learning model and image processing algorithms, in accordance with an embodiment of the present disclosure. The system 100 includes a computing device 110 having a processor 120, a storage 122, one or more non-transitory storage media 124, a network interface 126, a graphical user interface (GUI) 130, and a Document Boundary Detection Application 140. The GUI 130 includes a display and user input device.

The processor 120 of the computing device 110 is configured to execute the following modules, each of which is described in further detail below: Model Training Module 150, Image Capture Module 152, and Boundary Detection Module 154. The computing device 110 is further configured to receive, as inputs, at least one image 112 of a document or other object, and a deep learning document boundary model 114. The model 114 provides, to the computing device 110, object models representing shape priors, including shapes of various document boundaries, learned using machine learning techniques. Each image 112 represents a document and, in some cases, a background visible outside of the boundaries of the document, to be processed by the system 100. The computing device 110 is further configured to produce an output image 116 of the document that is based at least in part on the input image 112 and the deep learning document boundary model 114. The output image 116 can, for example, include a digital image of the document appearing in the input image 112 with the document boundaries marked, labeled, indicated, or identified in a human readable or machine-readable manner, such as variously described in this disclosure. Any number of standard or proprietary digital images (e.g., JPEG, bitmap, PNG, TIFF, QuickTime VR, and PANO) can be used for the input images 112 and output images 116 generated from the input images 112. Each of the modules 150, 152, and 154 can be used in conjunction with each other for document boundary detection, with the boundary detection process producing the output image 116 or other data associated with the document in the input image 112, such as data representing the boundary of the document in the input image 112 or data representing the content of the document as it appears in the input image 112.

The computing device 110 can be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system can be provided including a plurality of such computing devices.

The computing device 110 includes one or more storage devices 122 or non-transitory computer-readable media 124 having encoded thereon one or more computer-executable instructions or software for implementing techniques as variously described in this disclosure. The storage devices 122 can include a computer system memory or random access memory, such as a durable disk storage (which can include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 122 can include other types of memory as well, or combinations thereof. The storage device 122 can be provided on the computing device 110 or provided separately or remotely from the computing device 110. The non-transitory computer-readable media 124 can include, but are not limited to, one or more types of hardware memory, non-transitory tangible media (for example, one or more magnetic storage disks, one or more optical disks, one or more USB flash drives), and the like. The non-transitory computer-readable media 124 included in the computing device 110 can store computer-readable and computer-executable instructions or software for implementing various embodiments. The computer-readable media 124 can be provided on the computing device 110 or provided separately or remotely from the computing device 110.

The computing device 110 also includes at least one processor 120 for executing computer-readable and computer-executable instructions or software stored in the storage device 122 or non-transitory computer-readable media 124 and other programs for controlling system hardware. Virtualization can be employed in the computing device 110 so that infrastructure and resources in the computing device 110 can be shared dynamically. For example, a virtual machine can be provided to handle a process running on multiple processors so that the process appears to be using only one computing resource rather than multiple computing resources. Multiple virtual machines can also be used with one processor. Network interface (I/F) 126 can be any appropriate network chip or chipset which allows for wired or wireless connection between the device 110 and a communication network (not shown) and other computing devices and resources.

A user can interact with the computing device 110 through an output device 160, such as a screen or monitor, which can display one or more user interfaces or images, including the input image 112 and the output image 116, as provided in accordance with some embodiments. The output device 160 can also display other aspects, elements or information or data associated with some embodiments. The computing device 110 can include input or input/output devices 162 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 110 can further include a digital imager 164 configured to acquire the input image 112. The digital imager 164 can be a digital camera, digital document scanner, or other device configured to acquire the image 112. The computing device 110 can include other suitable conventional I/O peripherals. The computing device 110 includes or is operatively coupled to various suitable devices for performing one or more of the aspects as variously described in this disclosure.

The computing device 110 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 110 and performing the operations described in this disclosure. In an embodiment, the operating system can be run on one or more cloud machine instances.

In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the modules 150, 152, 154, the GUI 140, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 100, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be apparent.

As will be described in further detail below, the Model Training Module 150 is configured to train the deep learning document boundary model 114. The model 114 is used to determine the probability that a given pixel in the input image 112 belongs to the boundary of the document in the image. The probability can then be used to select certain pixels for further processing when determining the document boundary. The model 114 can be pre-determined; however, in some cases machine learning techniques can be used to further train the model 114 using various types of synthetic and real-world data.

The Image Capture Module 152 is configured to capture the image 112 using the digital camera 164, a scanner, or other image capturing device. For example, a user may take a photograph of, or scan, a paper document using the digital imager 162. In some cases, the image also includes a background that is not part of the document page and can be removed from the image or distinguished from the document page by the Boundary Detection Module 154, as will be described in further detail below.

Figure 2:
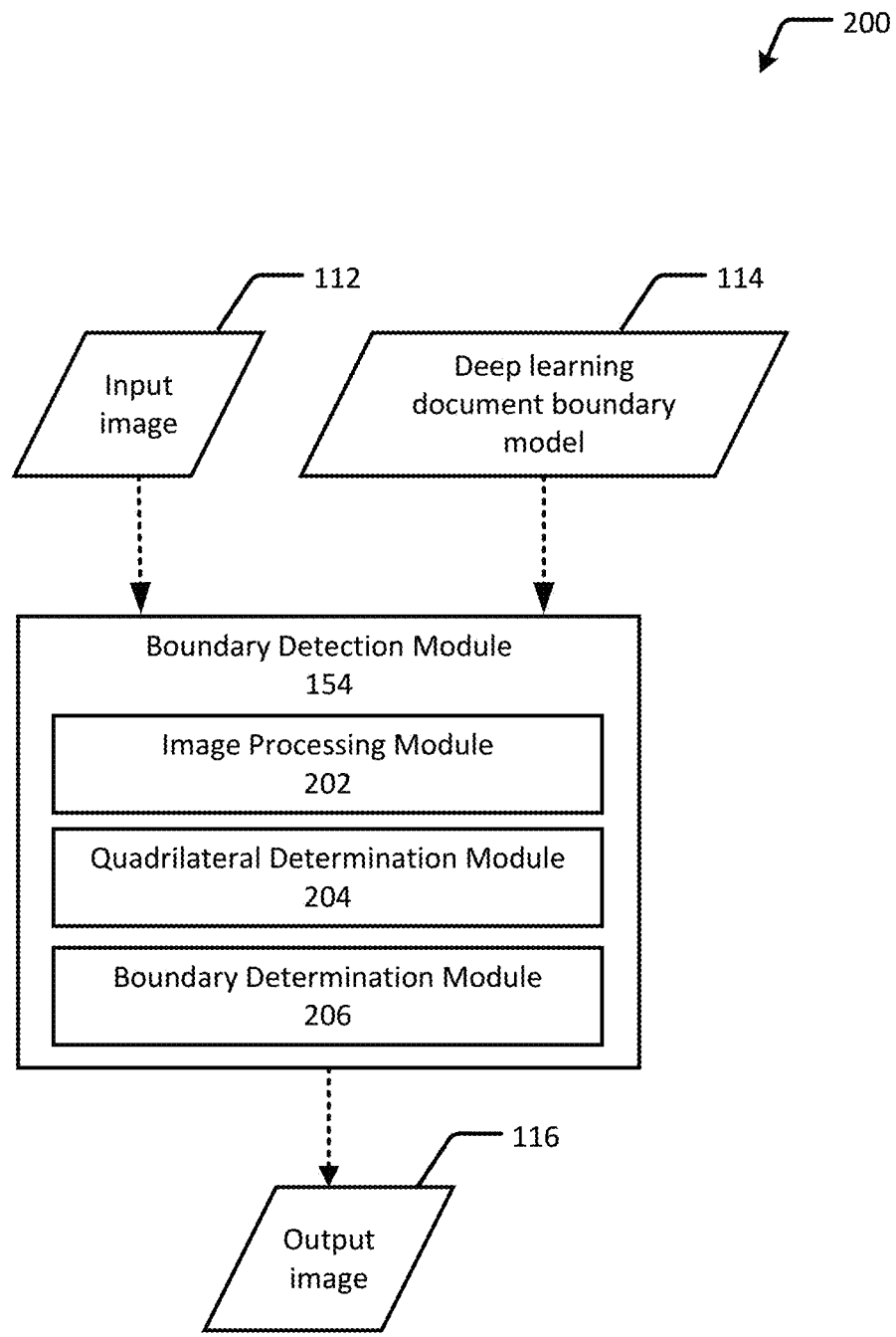
FIG. 2 is a functional diagram of an example document boundary detection process, in accordance with an embodiment of the present disclosure.

FIG. 2 is a functional diagram of the Boundary Detection Module 154 in further detail, in accordance with an embodiment of the present disclosure. The Boundary Detection Module 154 includes an Image Processing Module 202, a Quadrilateral Determination Module 204, and a Boundary Determination Module 206. The Boundary Detection Module 154 generates the output image 116 based at least in part on the input image 112 and the deep learning document boundary model 114. The function and operation of the Boundary Detection Module 154 is described in further detail with respect to FIGS. 3-25.

Figure 3:
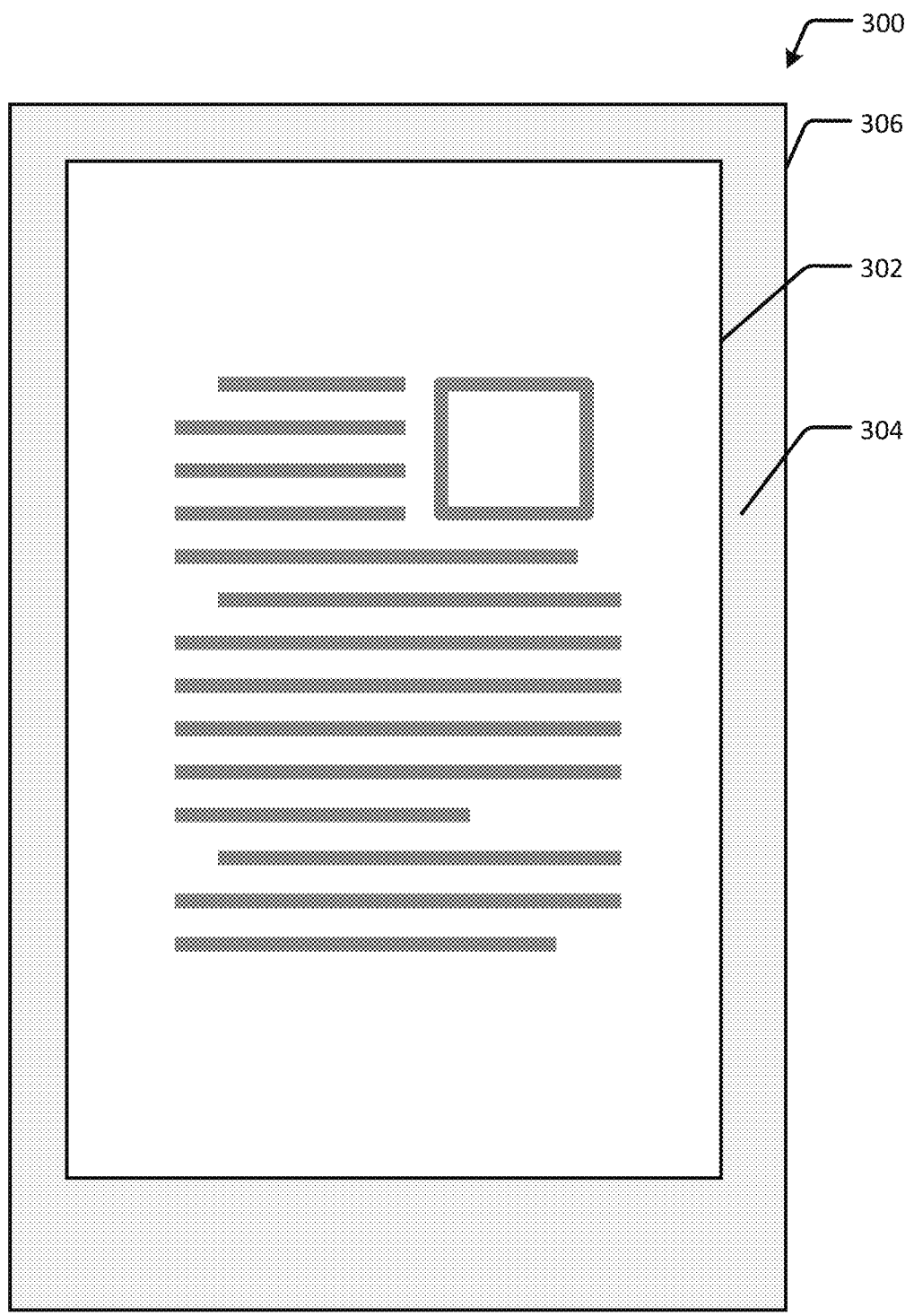
FIG. 3 shows an example input image of a document, in accordance with an embodiment of the present disclosure.

FIG. 3 shows an example input image 300 of a document, in accordance with an embodiment of the present disclosure. The input image 300 can be acquired, for example, using a digital camera or other suitable image acquisition device, such as a scanner. The document typically is a quadrilateral object, having two pairs of parallel edges representing the document boundary 302. Depending on how the image 300 is framed, the image can include a background 304 between the document boundary 302 and the edge 306 of the image. The size and shape of the background 304 can vary depending on the relative position of the document within the image 300. For example, if the document is not centered and squared within the frame of the image, then the one side of the document can appear closer to one edge 306 of the image 300 than the other. Thus, the BD techniques described in this disclosure can variously be used is to accurately determine where the document boundary 302 lies within the image given that the location of the document boundary 302 can be inconsistent from one image to another.

Figure 4:
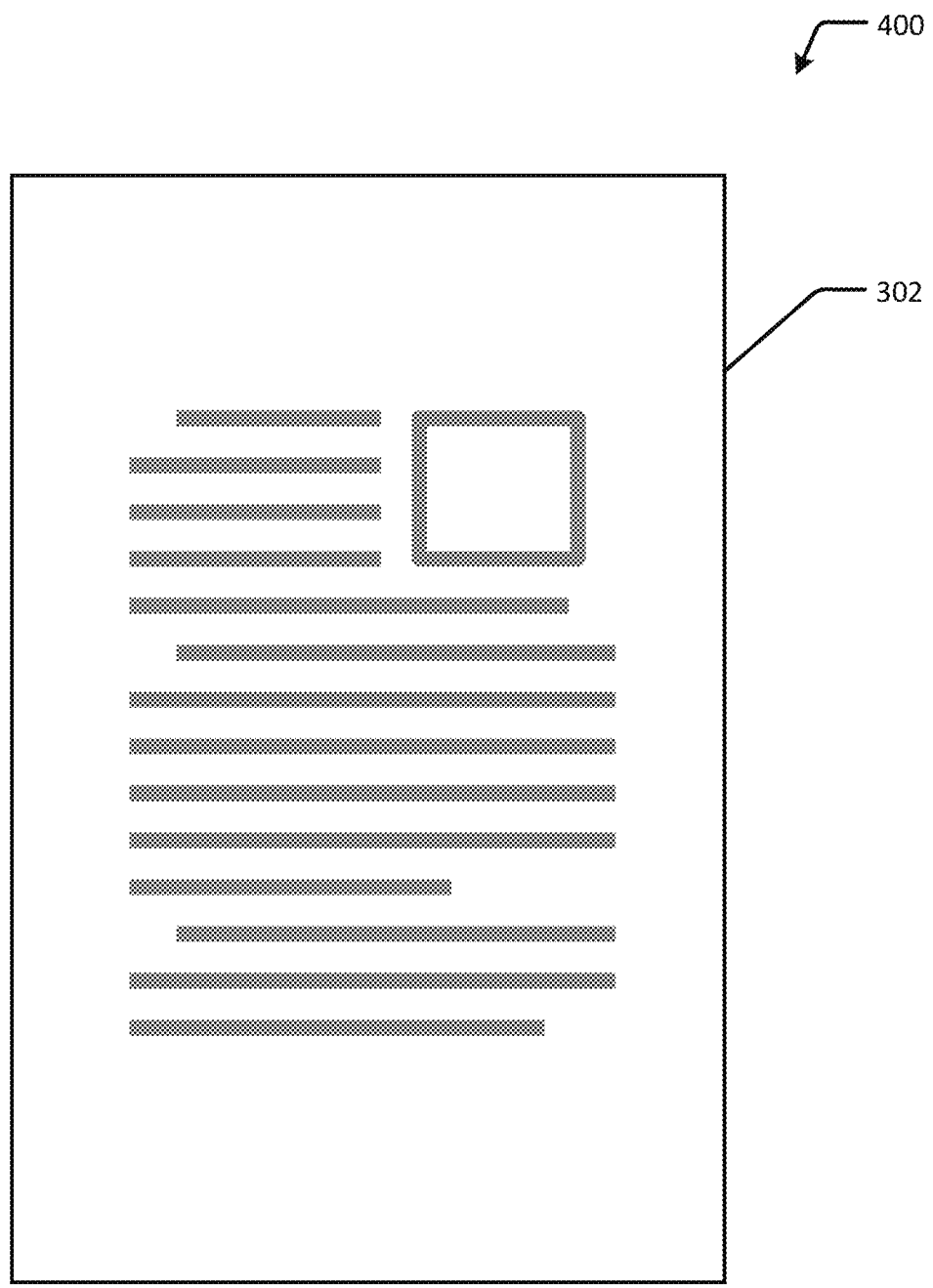
FIG. 4 shows an example output image of the document depicted in FIG. 3, in accordance with an embodiment of the present disclosure.

FIG. 4 shows an example output image 400 of the document depicted in FIG. 3 after the document boundary 302 has been determined using one or more of the techniques described in this disclosure. As can be seen, the background 304 portion of the input image 300 is excluded from the output image 400, leaving the document visible.

Deep Learning Model for Document Boundary Detection

In accordance with an embodiment of the present disclosure, the deep learning document boundary model 114 of FIG. 1 includes a convolutional neural network (CNN). The neural network is trained by the Model Training Module 150 to assist with computing the document boundary. The neural network contains, for example, 16 convolutional layers including eight encoder layers and eight decoder layers, seven skip connections layers, and one custom Sobel convolutional layer, which is used to compute the probability of a given image pixel belonging to the document boundary 302.

In some embodiments, the model 114 is built using a synthetic dataset of regular document types. The dataset includes images of documents placed above different backgrounds, such as textured, non-textured, tables, etc. The document boundary for each document is then determined manually and recorded into the dataset. Next, various shadow types (for example, a total of 14 shadow types are defined manually) are generated and blended to the document images, and their precomputed boundaries are recorded into the dataset.

In some embodiments, the model 114 is built using a synthetic dataset of white-on-white and low contrast document types. The dataset includes images of various whitish backgrounds (for example, different office tables colors). Documents are generated by exporting PDF files as images, which are placed on these backgrounds. The document boundary for each document is then determined manually and recorded into the dataset. The dataset is generated from these documents by placing them onto different background colors and applying different synthetic shadow patterns, such as described above for regular synthetic documents.

In some embodiments, the model 114 is built using a synthetic dataset of external parallel table edge types. The dataset includes images of backgrounds having sharp edges, such as a floor mat, office table with textured patterns, etc. The dataset is generated from these documents by placing them onto the backgrounds, keeping the document edge and edges in the background close to parallel.

In some embodiments, the model 114 is built using a real-world training dataset. The dataset is generated from applications. The document boundary for each document is then determined manually and recorded into the dataset (for example, as a PDF document).

In accordance with an embodiment, Sobel edge detection is carried out on an input image during training of the model 114. The loss function is biased toward the pixels, which are present in the Sobel edge detection output. Thus, the loss is reduced for the pixels that lie on the Sobel edges, which makes the training more aligned to the output pixels on the edges.

Several new loss functions, described below, can be used during model training. For an input image, the foreground is defined by the pixels belonging to the document boundary 302. The background is defined by all other pixels. The loss is greater for pixels further away from the ground truth. This is referred to as a distance loss. For example, for an input image, if a pixel is a background pixel but has been classified as foreground pixel, it is a false positive (FP) case. A FP near the true document boundary of the document is more acceptable than a distant one. The loss is less for correct pixels found in a group (neighbors). This referred to as a group loss. For example, for an input image, if a pixel is a foreground pixel but has been classified as background pixel, it is a false negative (FN) case. If there are many spatially co-occurring FN predictions, they will all contribute to each other's loss, heavily penalizing larger sections of missed foreground (document boundary). Note that distance loss and group loss are pixel level loss functions. L1 is a loss functions in machine learning which is used to minimize the error. L1 Loss function stands for Least Absolute Deviations. L1 loss, combined with group loss and distance loss, is the pixel loss. Pixel loss is summed over for every pixel of the image to get loss for a training sample image. The combined loss function is referred to as a combined loss.

External fuzz loss exists where the overall background pixel document boundary probability sum is minimized. Internal fuzz loss exists where the overall foreground pixel document boundary probability sum is maximized. The combined loss is added to the fuzz loss (both internal and external) to define the final loss for an input training sample image.

Figure 5:
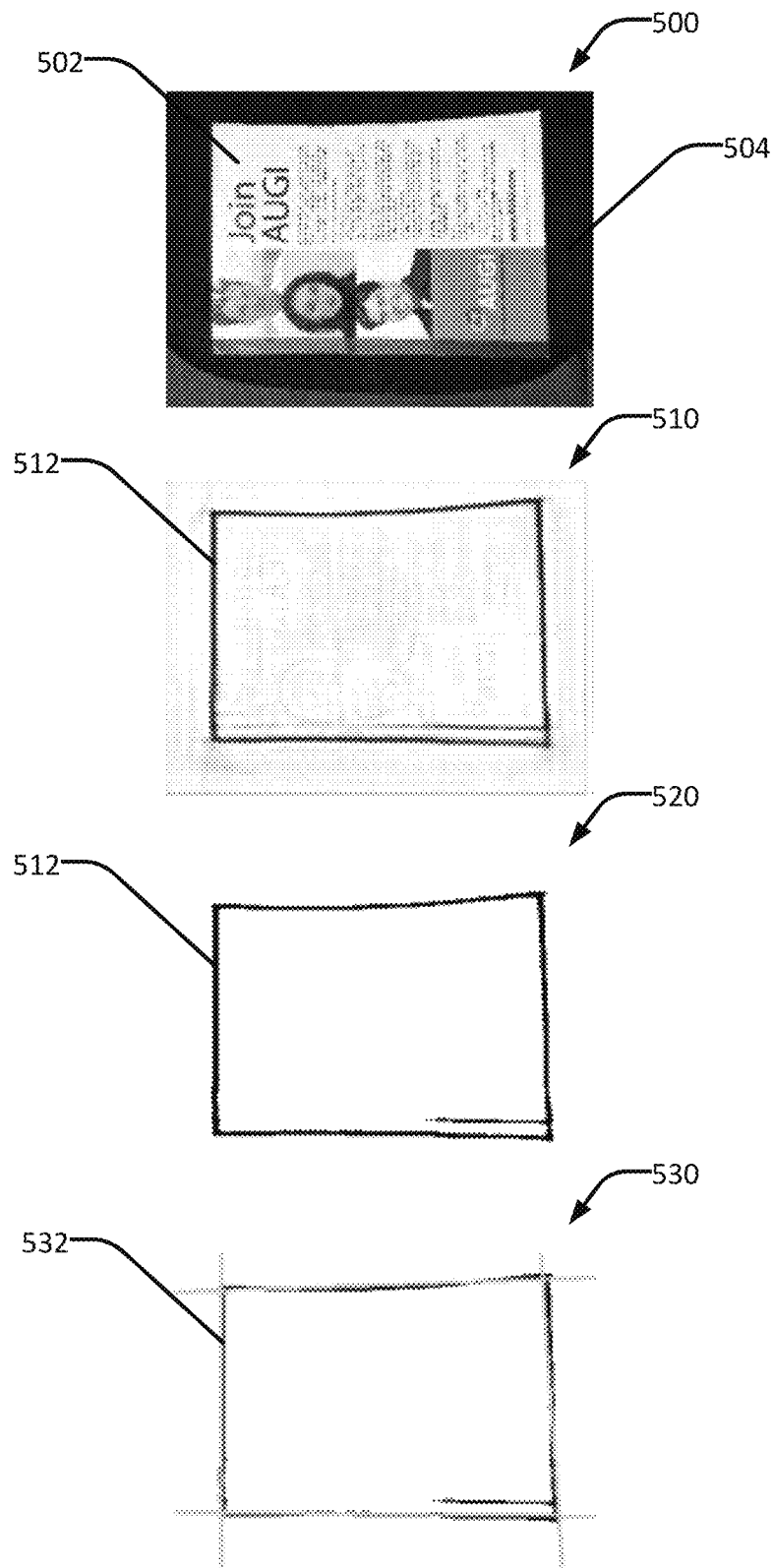
FIGS. 5, 6, 7, and 8 are several examples of a series of input and output images obtained using a machine learning model for document boundary detection, in accordance with an embodiment of the present disclosure.

FIG. 5 is an example series of input and output images obtained using the machine learning model 114 for document boundary detection, in accordance with an embodiment of the present disclosure. Image 500 is an input image, such as one that can be obtained using the digital camera 164. The input image 500 includes a document 502 and a background 504. Image 510 is a gray output image obtained from the input image 500 using the machine learning model 114, showing an approximation of a document boundary 512. Image 520 is a binarized gray image of the document using a hysteresis binarization algorithm. Image 530 is an output image showing an example quadrilateral 532 computed from the binarized image 520, which approximates the document boundary 512. Techniques for computing the quadrilateral are discussed in further detail below.

Figure 6:
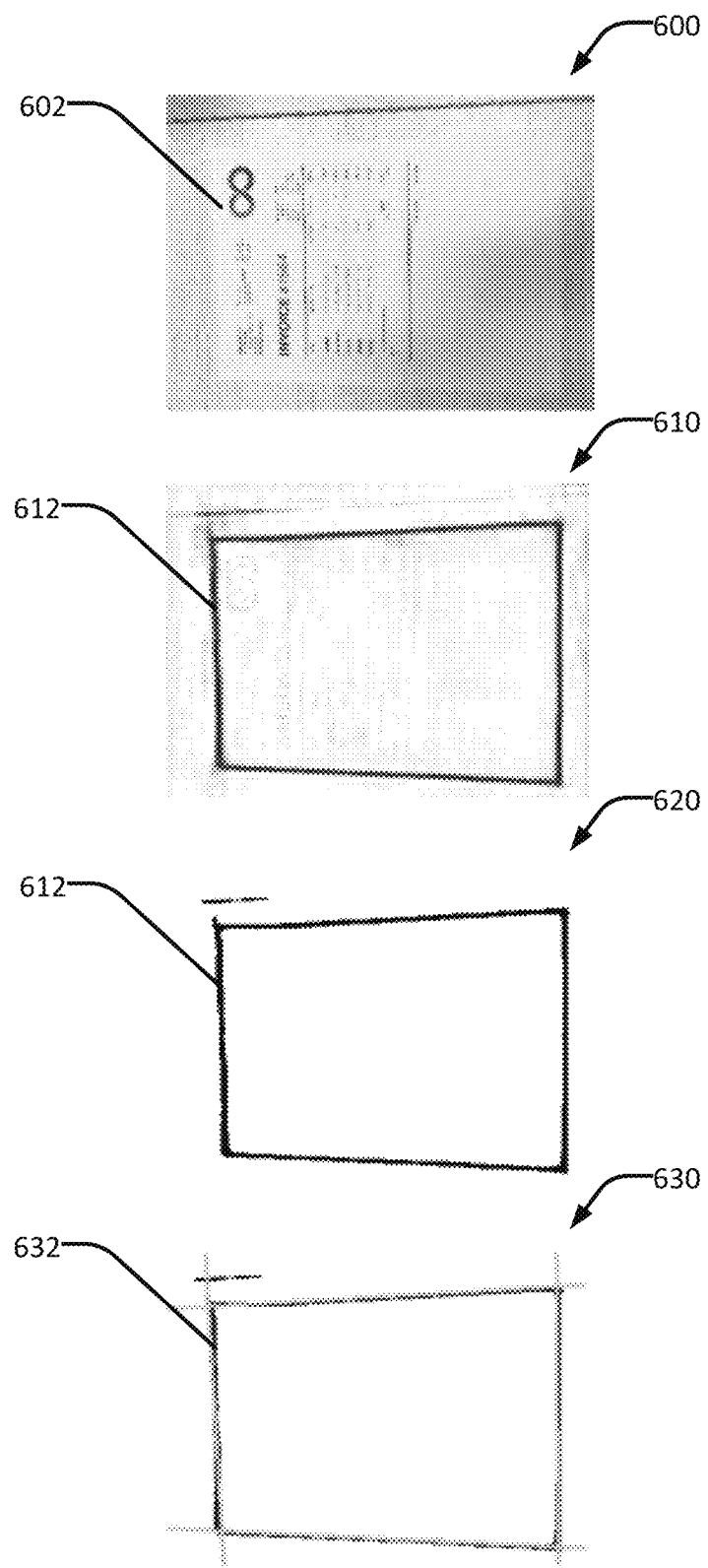

FIG. 6 is another example series of input and output images obtained using the machine learning model 114 for document boundary detection, in accordance with an embodiment of the present disclosure. Like FIG. 5, FIG. 6 shows an input image 600 of a document 602, a gray output image 610 obtained from the input image 600 using the machine learning model 114, a binarized gray image 620 of the document using a hysteresis binarization algorithm, and an output image 630 an output image showing an example quadrilateral 632 computed from the binarized image 620, which approximates a document boundary 612.

Figure 7:
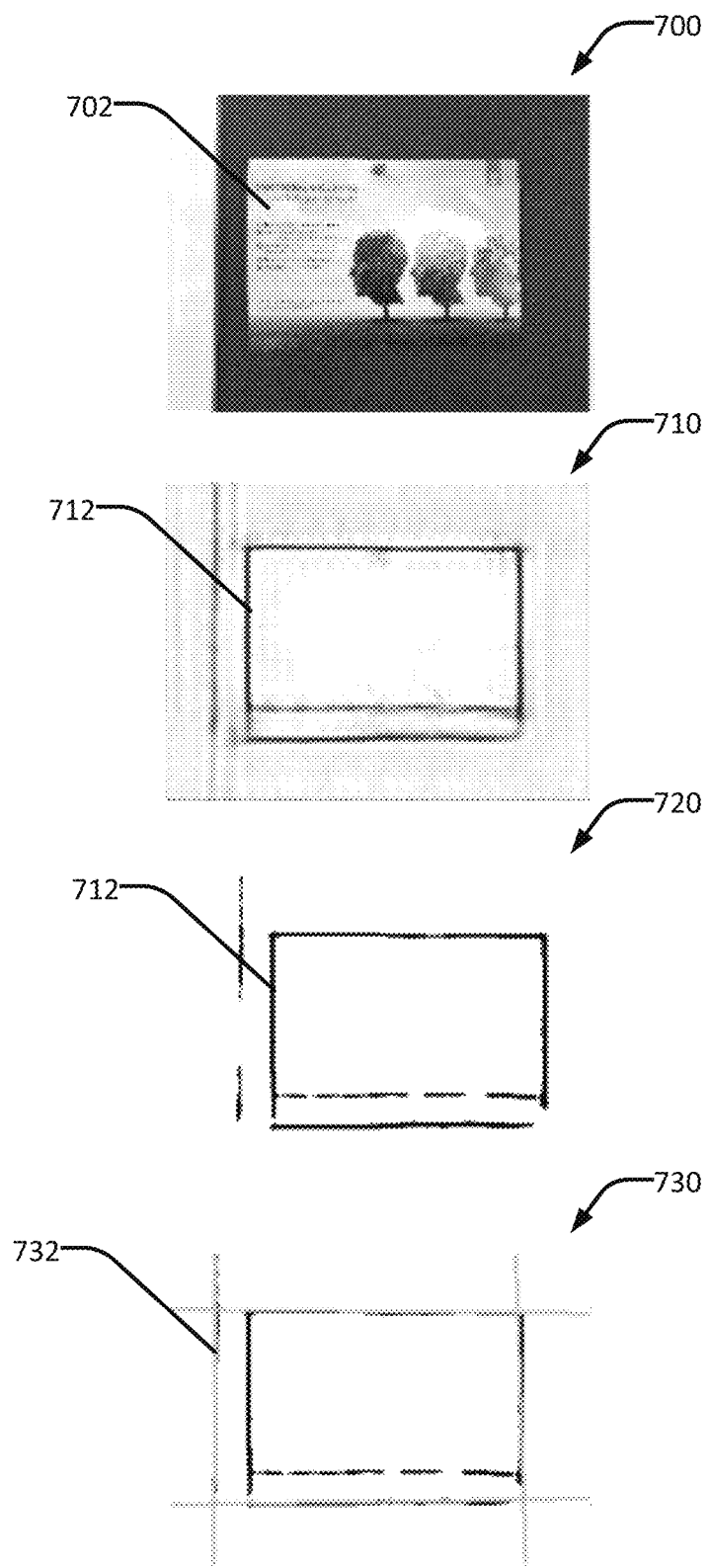

FIG. 7 is yet another example series of input and output images obtained using the machine learning model 114 for document boundary detection, in accordance with an embodiment of the present disclosure. Like FIG. 5, FIG. 7 shows an input image 700 of a document 702, a gray output image 710 obtained from the input image 700 using the machine learning model 114, a binarized gray image 720 of the document using a hysteresis binarization algorithm, and an output image 730 an output image showing an example quadrilateral 732 computed from the binarized image 720, which approximates a document boundary 712.

Figure 8:
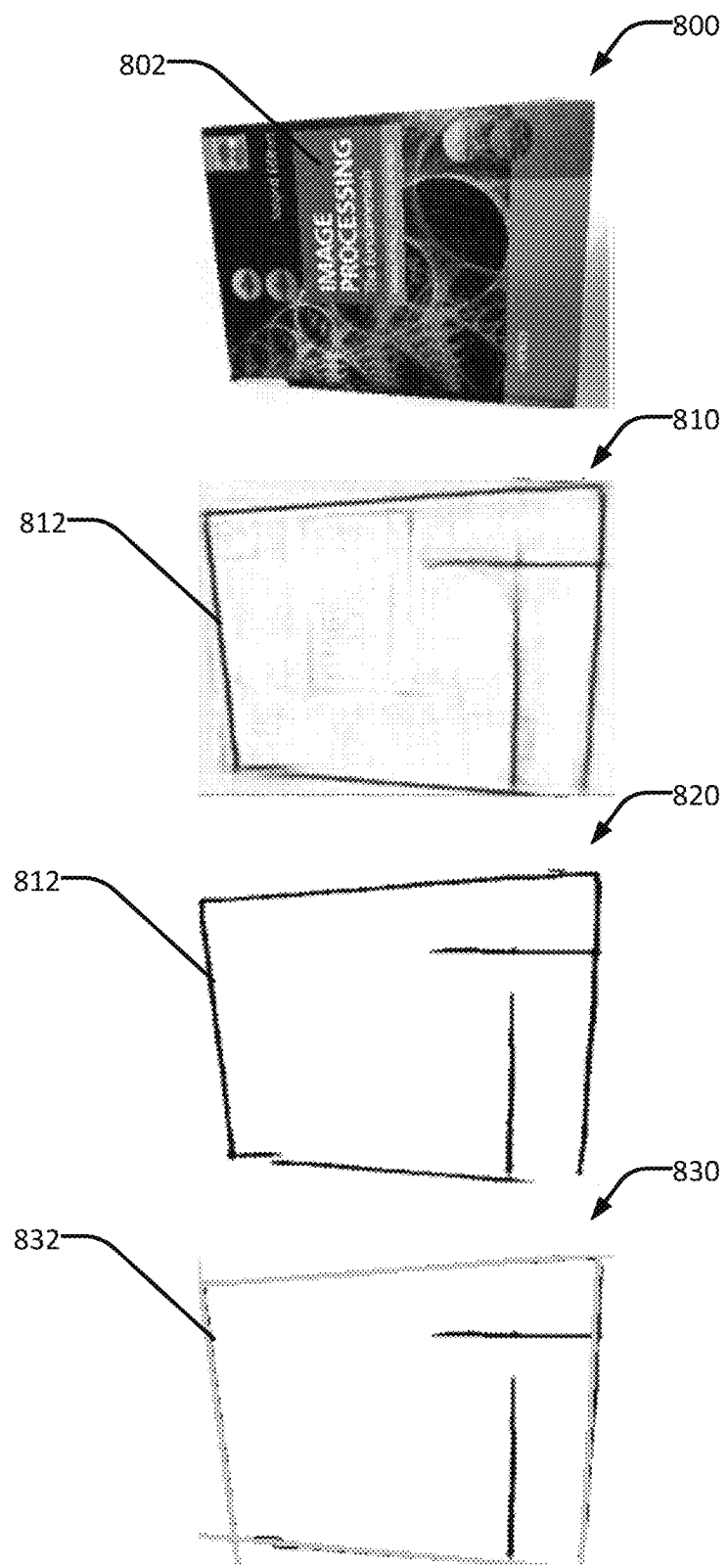

FIG. 8 is yet another example series of input and output images obtained using the machine learning model 114 for document boundary detection, in accordance with an embodiment of the present disclosure. Like FIG. 5, FIG. 8 shows an input image 800 of a document 802, a gray output image 810 obtained from the input image 800 using the machine learning model 114, a binarized gray image 820 of the document using a hysteresis binarization algorithm, and an output image 830 an output image showing an example quadrilateral 832 computed from the binarized image 820, which approximates a document boundary 812.

Image Processing Algorithm for Document Boundary Detection

Figure 9:
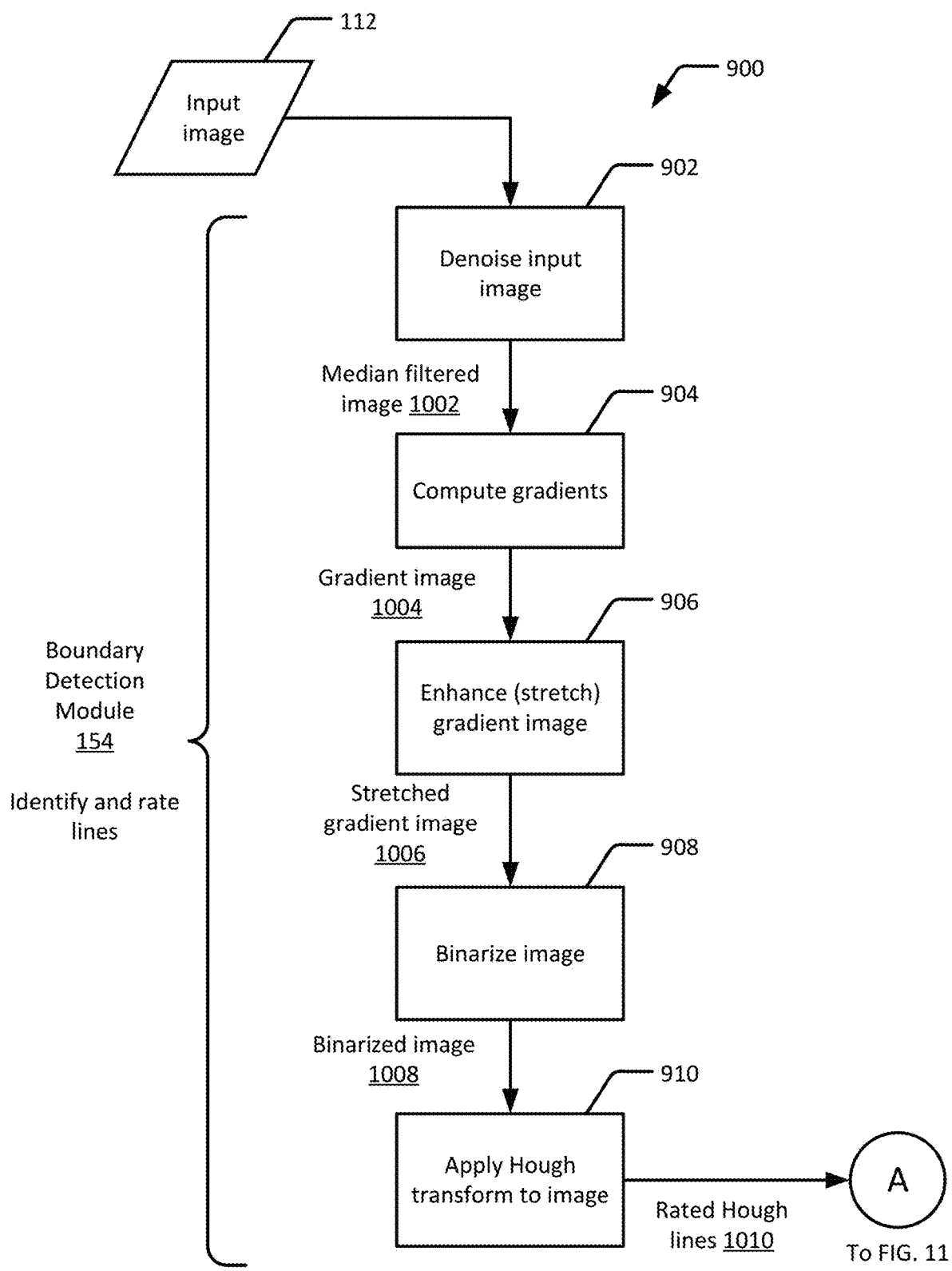
FIG. 9 is a flow diagram of an example image processing method 900, in accordance with an embodiment of the present disclosure.
Figure 10:
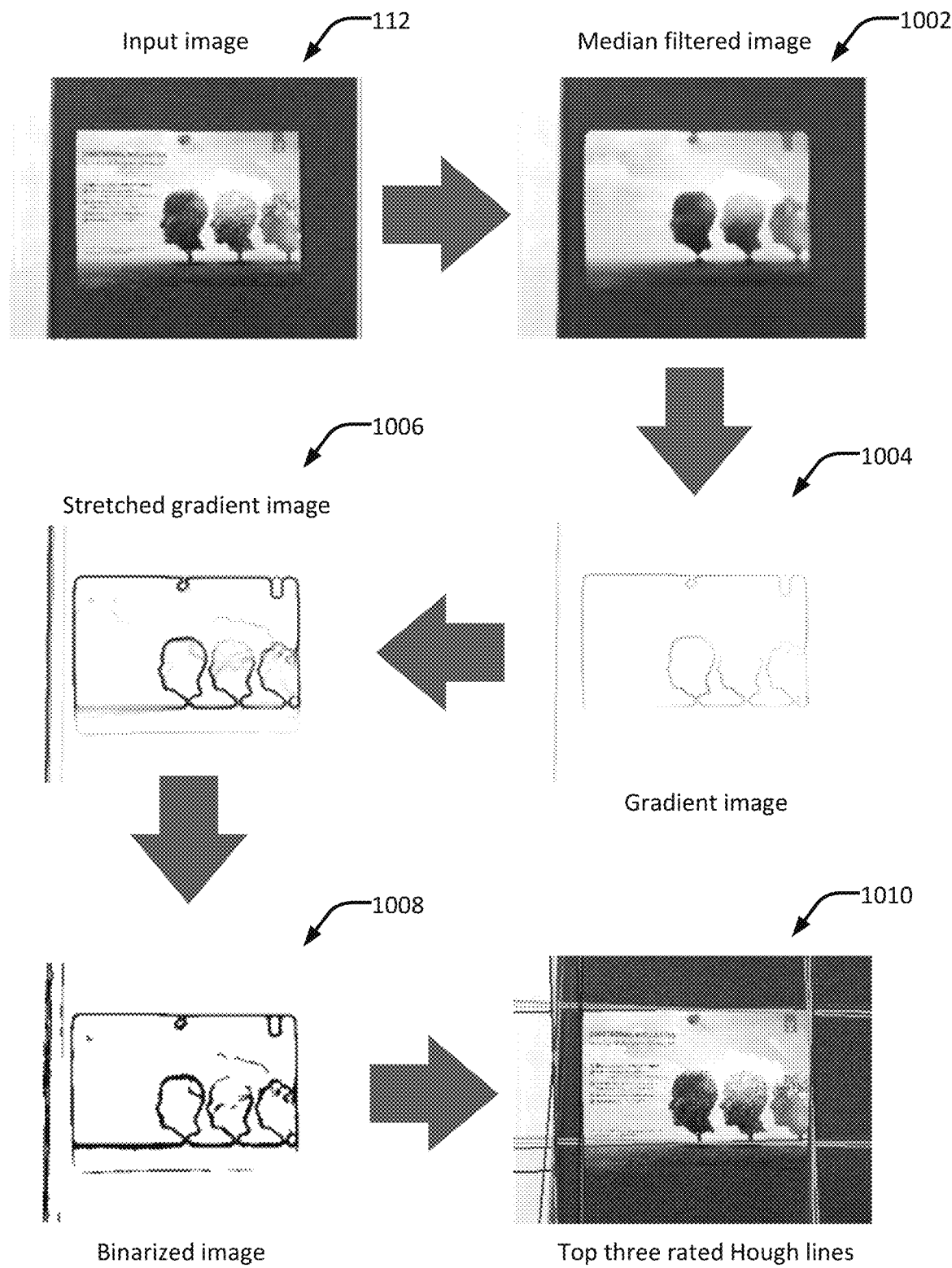
FIG. 10 shows an example of an input image with Hough rated lines each representing an approximation of a document boundary, in accordance with an embodiment of the present disclosure.

FIG. 9 is a flow diagram of an example image processing method 900, in accordance with an embodiment of the present disclosure. FIG. 10 shows several example images illustrating the method 900. The method 900 can be implemented, for example, in the Boundary Detection Module 154. The method 900 includes computing a document boundary from the input image 112. First, the input image 112 is denoised 902 using a median filter with window size of 8 and 5 for high contrast and low contrast images, respectively, to produce a medial filtered image 1002. This removes noise, small text components, and other artifacts from the input image 112.

Next, gradients are computed 904 from the median filtered image 1002 to produce a gradient image 1004. The gradient image 1004 is enhanced 906 using a histogram stretching algorithm. The threshold values used for stretching are tuned based on the dataset. This step enhances the gradients around the document boundaries to produce a stretched gradient image 1006. Next, the enhanced (stretched) gradient image 1006 is binarized using hysteresis binarization algorithm with suitable threshold values to produce a binarized image 1008. Next, a Hough transform is applied 910 to the binarized image 1008 to find the lines in each side of the image. The lines are rated using a suitable line rating algorithm, such as described in U.S. Pat. No. 9,483,834, the entirety of which is incorporated by reference herein. Image 1010 in FIG. 10 shows an example of the input image 112 with the top three rated Hough lines each representing an approximation of the document boundary.

Computation of Quadrilaterals

Figure 11:
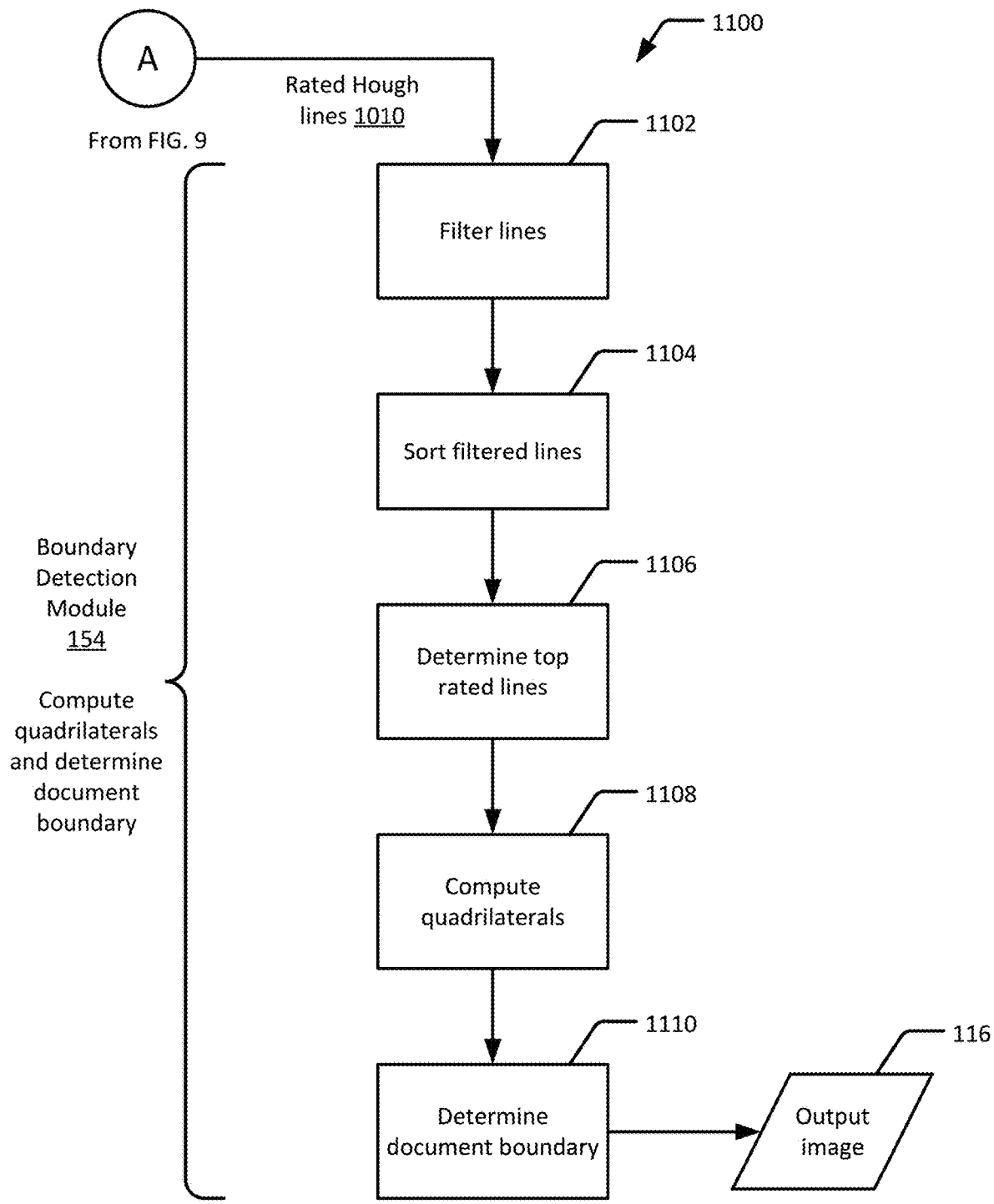
FIG. 11 is a flow diagram of another example image processing method, in accordance with an embodiment of the present disclosure.

FIG. 11 is a flow diagram of another example image processing method 1100, in accordance with an embodiment of the present disclosure. Once the lines on each side of the document have been rated, a set of quadrilaterals can be computed using the highest-rated Hough lines in the image 1010. Consider all the lines (by applying Hough transform on the binarized image) with their ratings. For each side of the document, first consider all the respective lines with their respective ratings. Filter each of the lines by merging 1102 nearby lines into a single line if the distance between the lines to be merged and the angle between the lines to be merged are both less than corresponding threshold values.

Next, consider all the filtered lines on each side of the document and sort 1104 the lines based on their ratings in descending order. Next, determine 1106 the three topmost rated lines on each side of the document. Note that, on a given side of the document, there may not exist any lines with top ratings (as Hough transform fails to compute any line on that side); in such a case, consider the image boundary as the best rated line for that side of the document.

Now, for the three top-rated lines in each side of the document, compute 1108 all possible combinations of quadrilaterals using these lines. Hence, there can be a maximum of 81 quadrilaterals computed from 12 lines (3 lines on each of the four sides of document) in the set. The document boundary is then determined 1110 from the set of quadrilaterals.

Figure 12:
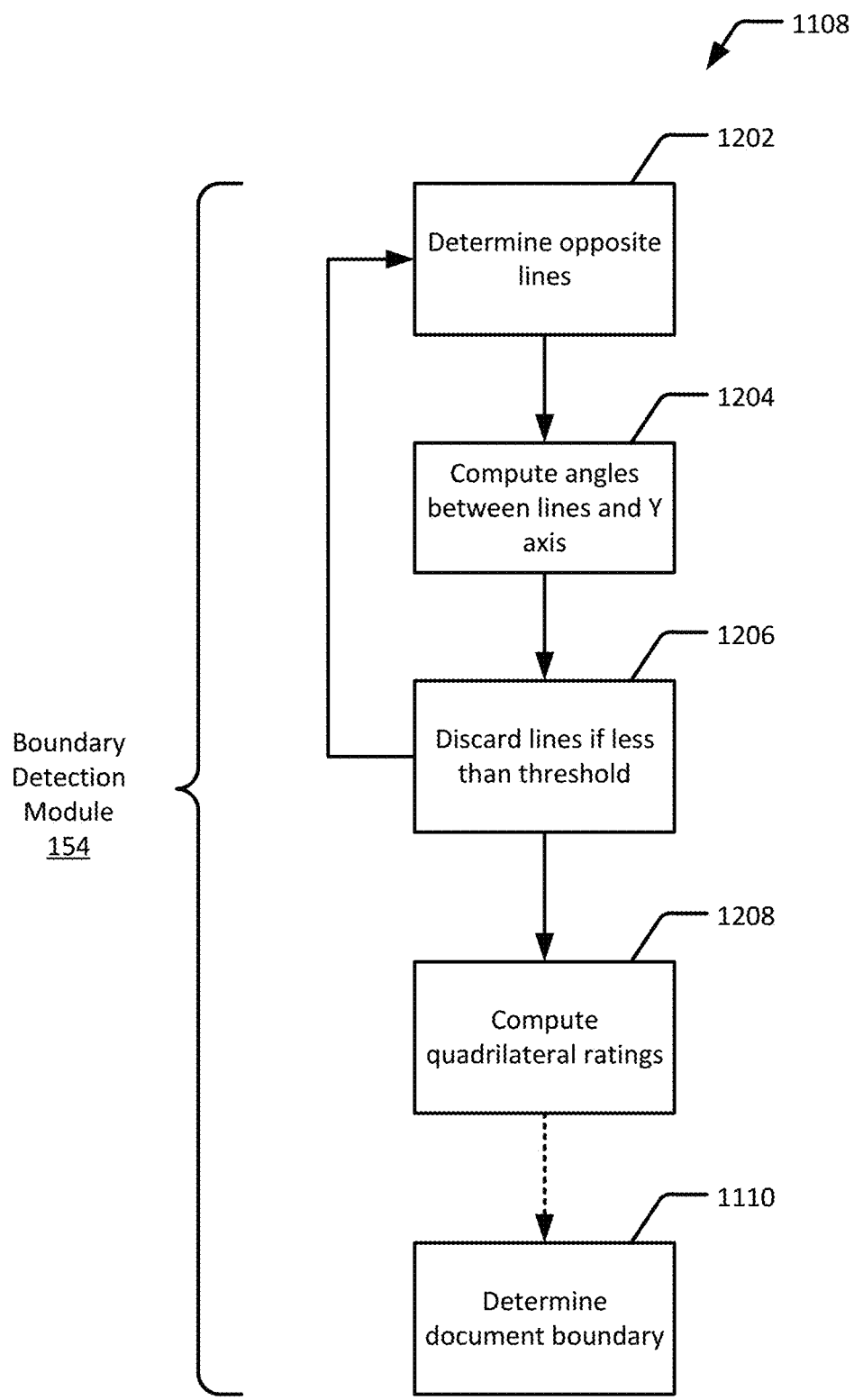
FIG. 12 is a flow diagram of a method for computing quadrilaterals, in accordance with an embodiment of the present disclosure.

FIG. 12 is a flow diagram of a method for computing the quadrilaterals 1108, in accordance with an embodiment of the present disclosure. For each of the 81 quadrilaterals in the set, first determine 1202 the opposite lines of the quadrilateral. For example, consider the left and right lines of the quadrilateral. Next, compute 1204 the angles between the left and right lines and the Y axis. If the difference between the two angles is less than a suitable threshold, then discard 1206 the quadrilateral from the list of 81 quadrilaterals. The threshold can, for example, be an angle of less than 15 degrees or greater than 75 degrees, although it will be understood that other threshold values can be used. Repeat the determining 1202, the computing 1204, and the discarding 1206 steps for the top and bottom lines of the quadrilateral. Similarly, consider another pair of opposite lines of the quadrilateral, i.e., top and bottom lines. Again, repeat the determining 1202, the computing 1204, and the discarding 1206 steps for each pair of lines.

Next, for each of the quadrilaterals remaining in the set (can be less than 81, as some of them may have been filtered/discarded), compute 1208 the rating of the quadrilateral by assuming that the margins of a document will be, on average, similar to each other, and the areas outside of the document, on average, will also be quite similar to each other. If the quadrilateral represents a document boundary, then in addition to the previous two conditions, the margins of the document and the areas outside of the document will be, on average, quite dissimilar to each other. Based on the above-mentioned assumptions, the rating of each of the quadrilateral is computed as follows.

Figure 13:
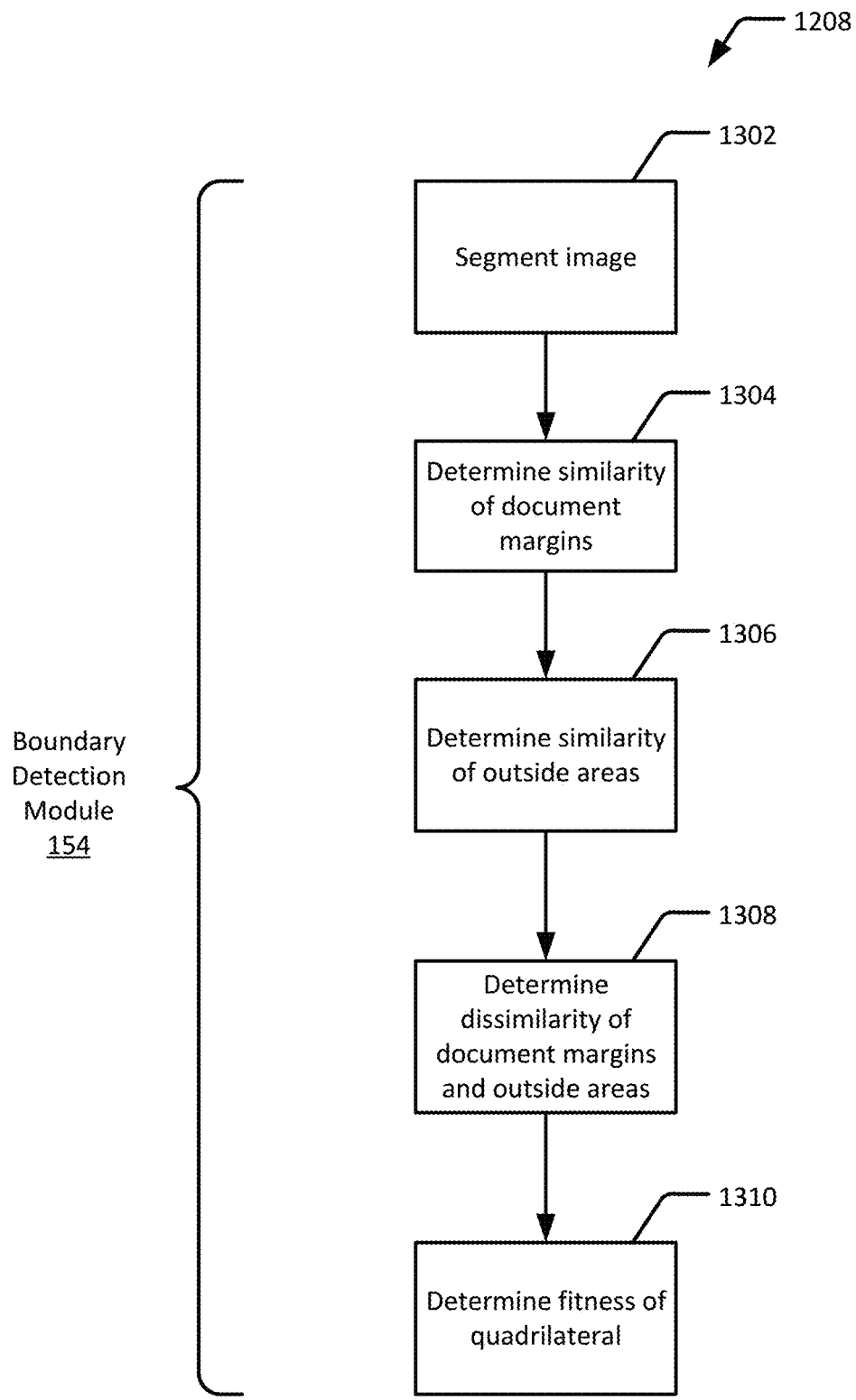
FIG. 13 is a flow diagram of a method for rating quadrilaterals, in accordance with an embodiment of the present disclosure.
Figure 14:
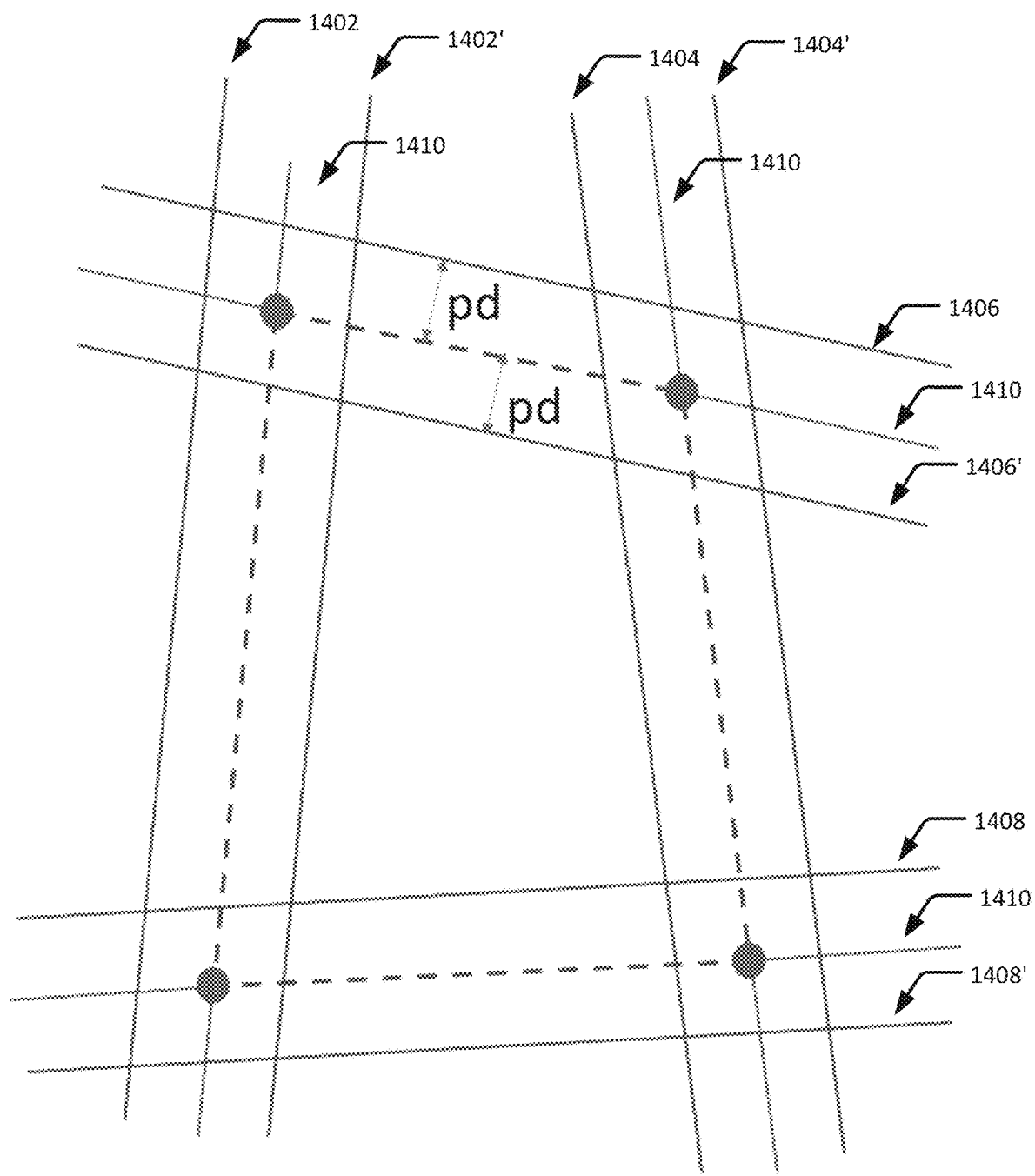
FIGS. 14, 15, 16, and 17 are example depictions of a method for computing and rating quadrilaterals, in accordance with an embodiment of the present disclosure.
Figure 15:
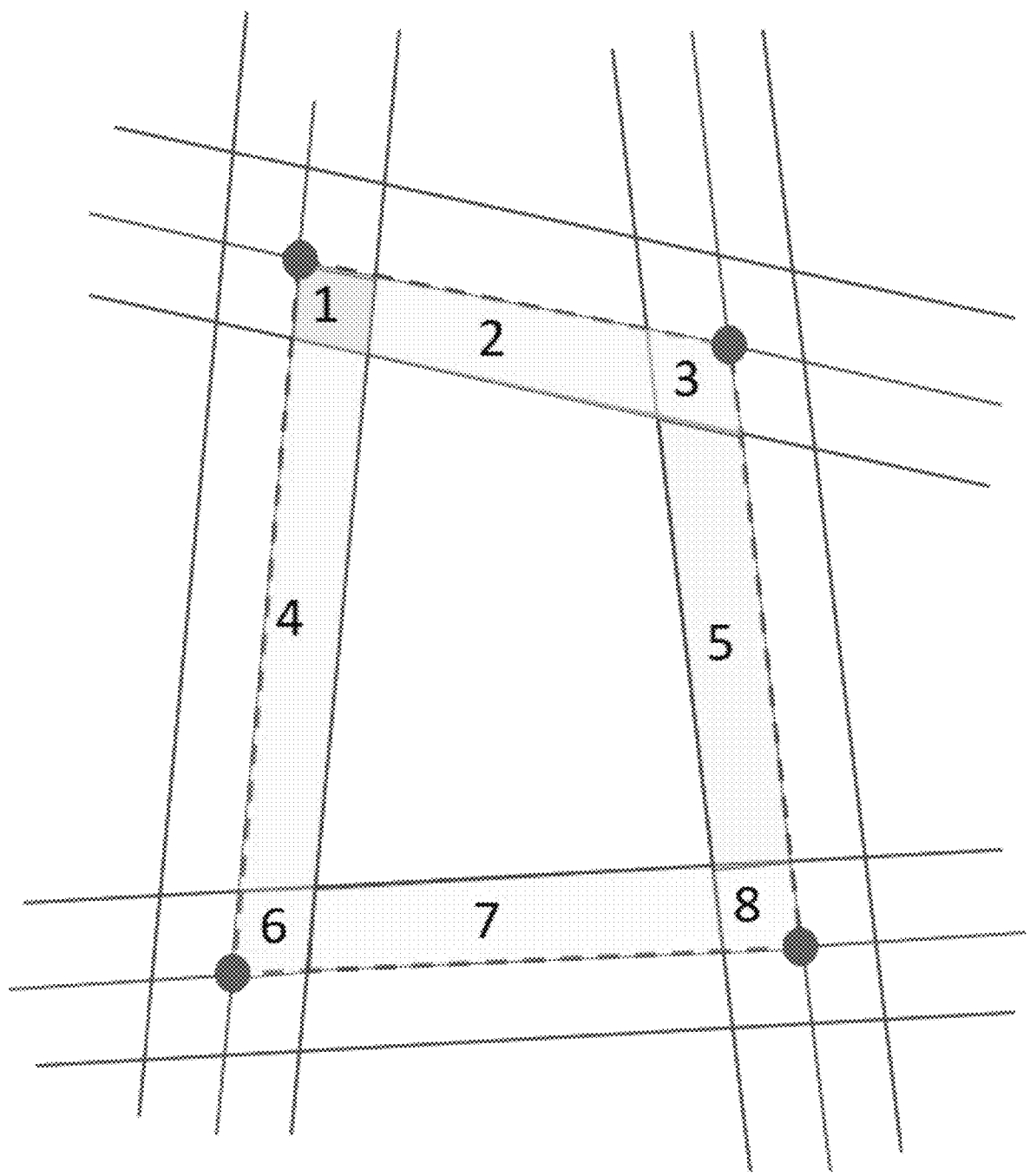

FIG. 13 is a flow diagram of a method for rating 1208 the quadrilaterals, in accordance with an embodiment of the present disclosure. The image region is segmented 1302 by first drawing pairs of lines 1402, 1402', 1404, 1404', 1406, 1406', 1408, 1408' parallel to and on either side of each of the four boundaries 1410 of the quadrilateral. These lines are separated by an experimentally determined distance 'pd', as shown in FIG. 14. The image is then segmented into several smaller quadrilateral segments, as shown in FIG. 15. In FIG. 15, the original quadrilateral is marked with gray lines and circles representing the four corners of the quadrilateral. All the other parallel pairs are separated by the same distance 'pd.'

Next, the similarity of document margins is determined 1304. The similarity of the document margins is also referred to as the inside similarity. Some of the quadrilateral segments potentially represent the margins of the document. The margins should be quite similar, on average. To determine the similarity, the average color of the four bands that form the four margins of the document is calculated. The numbered segments that form the four bands are as follows: Top: 1, 2, 3; Bottom: 6, 7, 8; Left: 1, 4, 6; and Right: 3, 5, 8.

The average color for each of the bands is the average of the colors of pixel in the segments that correspond to that band. The difference of the average colors between each pair of bands is then calculated. The color difference is calculated by converting the colors to the CIE-Lab color space and then taking mean square difference.

The formula is as follows:

$$\text{LabDiff} = \sqrt{(L_1-L_2)^2 + (a_1-a_2)^2 + (b_1-b_2)^2}$$

where L, a, and b are the components of the color in the CIE-Lab color space. The distance 'pd' shown in FIG. 14 corresponding to the inner portion of the quadrilateral may vary from one side of the quadrilateral to another. The average distances of pairs of margins can be used to determine an inside similarity measure. For example, the average 'pd' for the top and left, top and right, left and bottom, right and bottom, top and bottom, and left and right can be used in a weighted sum to determine the inside similarity IS:

$$IS = w_1*d_1 + w_2*d_2 + w_3*d_3 + w_4*d_4 + w_5*d_5 + w_6*d_6$$

The weights can be determined experimentally.

Figure 16:
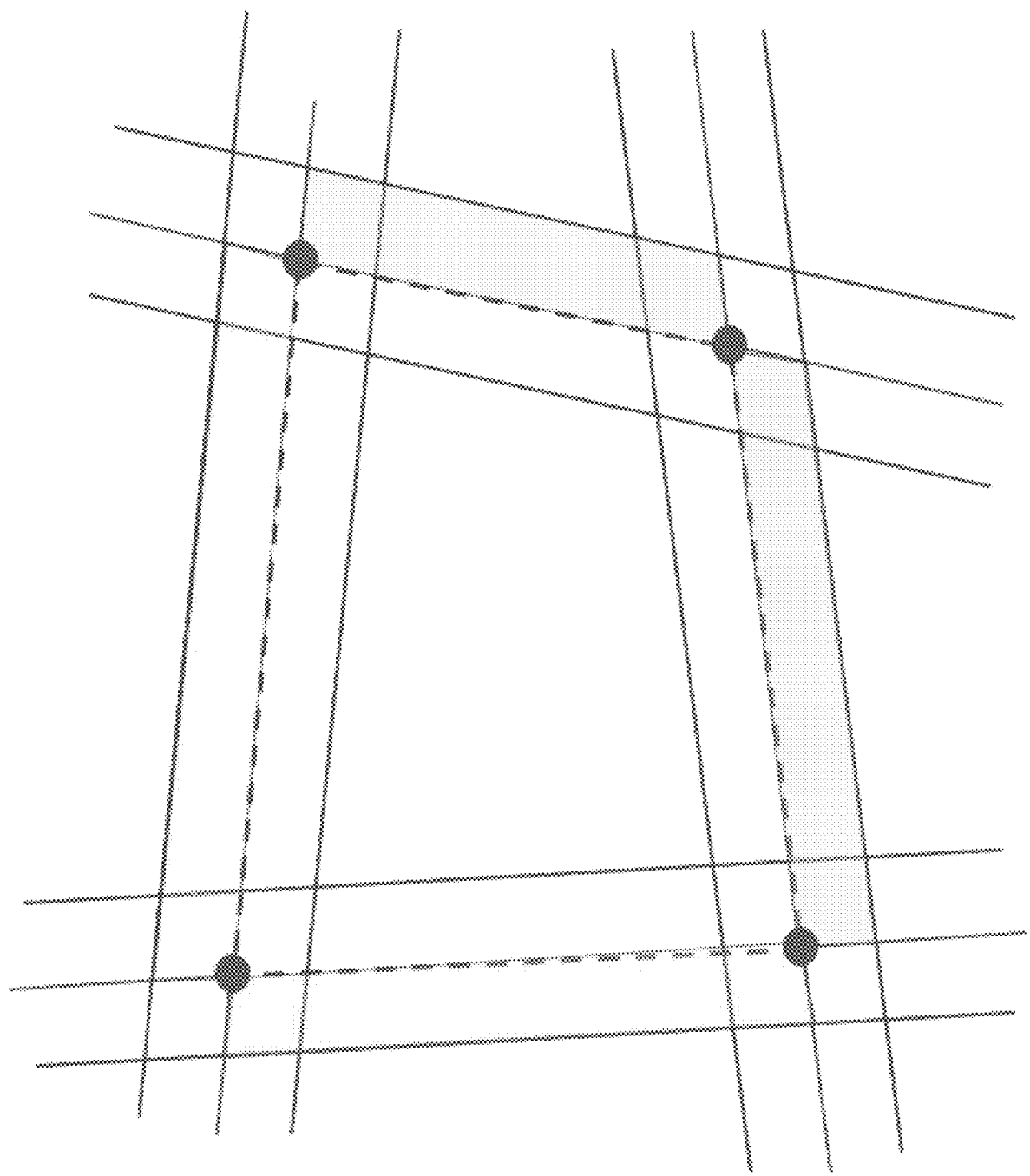

Referring again to FIG. 13, next, the similarity of outside areas is determined 1306. The similarity of the outside areas is also referred to as the outside similarity. Some of the quadrilateral segments potentially represent the areas outside the document, such as shown as filled bands in FIG. 16. The circles continue to mark the corners of the quadrilateral under consideration. To determine the similarity of these bands, the four bands that potentially form the outside of the document are considered. Unlike the segments that form the document (inside) margins, there is no overlap of segments between the outside bands under consideration in this step as can be seen in FIG. 16.

The distance 'pd' shown in FIG. 14 corresponding to the outer portion of the quadrilateral may vary from one side of the quadrilateral to another. The average distances of pairs of margins can be used to determine an outside similarity measure. For example, the average 'pd' for the top and left, top and right, left and bottom, right and bottom, top and bottom, and left and right can be used in a weighted sum to determine the outside similarity OS:

$$OS = *d_1 + w_2*d_2 + w_3*d_3 + w_4*d_4 + w_5*d_5 + w_6*d_6$$

The weights can be determined experimentally and are not necessarily the same weights used for calculating the inside similarity IS.

Figure 17:
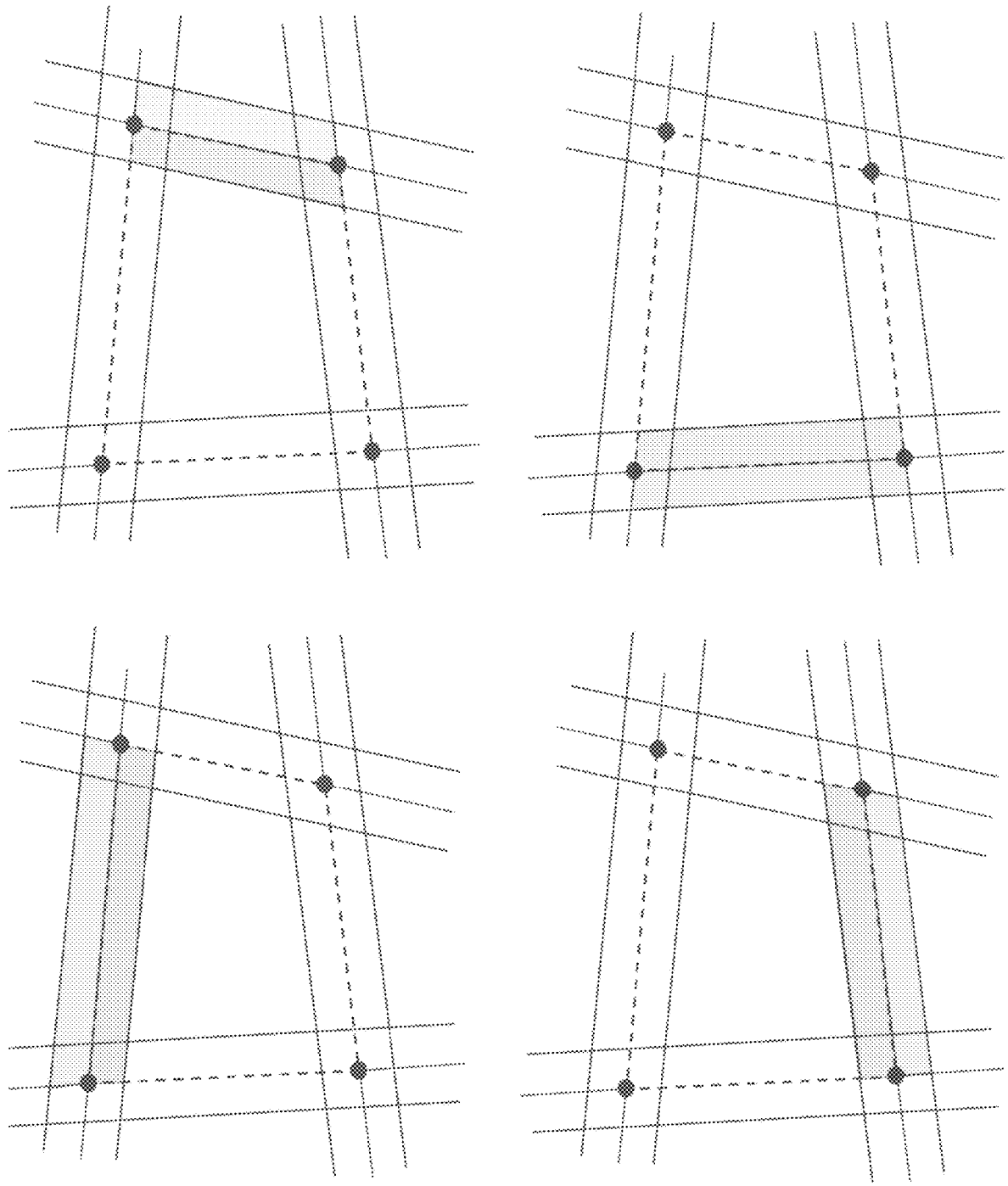

Referring again to FIG. 13, next, the dissimilarity of the document margins and outside areas is determined 1308. As noted above, some segments represent the potential margins of the document and some segments represent the potential outside areas of the document. For each of the document boundaries, there is a band of segments that form the inside/outside pair for that boundary. These pairs of bands are shown in FIG. 17 with the light-colored bands on the outside and the dark colored bands on the inside. The circles continue to mark the corners of the quadrilateral under consideration. For each pair of bands, we calculate a LabDiff value for the average colors of the two bands. These gives us a set of four values for top, left, bottom, and right. Using these values, we calculate a boundary dissimilarity BD measure by calculating a weighted sum:

$$BD = -1*(w_{top}*d_{top} + w_{left}*d_{left} + w_{bottom}*d_{bottom} + w_{right}*d_{right})$$

The weights are experimentally determined.

Referring again to FIG. 13, next, the fitness of the quadrilateral is determined 1310. Given the inside similarity IS, the outside similarity OS, and the boundary dissimilarity BD, a quadrilateral rating QR can be determined that represents the fitness of the quadrilateral as a document boundary:

$$QR = w_{IS}*IS + w_{OS}*OS + w_{BD}*BD$$

The weights are experimentally determined. This quadrilateral rating gives an improved measure of the fitness of the quadrilateral as a document boundary versus using individual ratings for each line of the quadrilateral as a measure of fitness. The final quadrilateral rating is computed as follows:

$$\text{Final QR} = (W_1 * QR) + (W_2 * \Sigma_{i=1}^{4} LRi)$$

The weights are experimentally determined.

Figure 18:
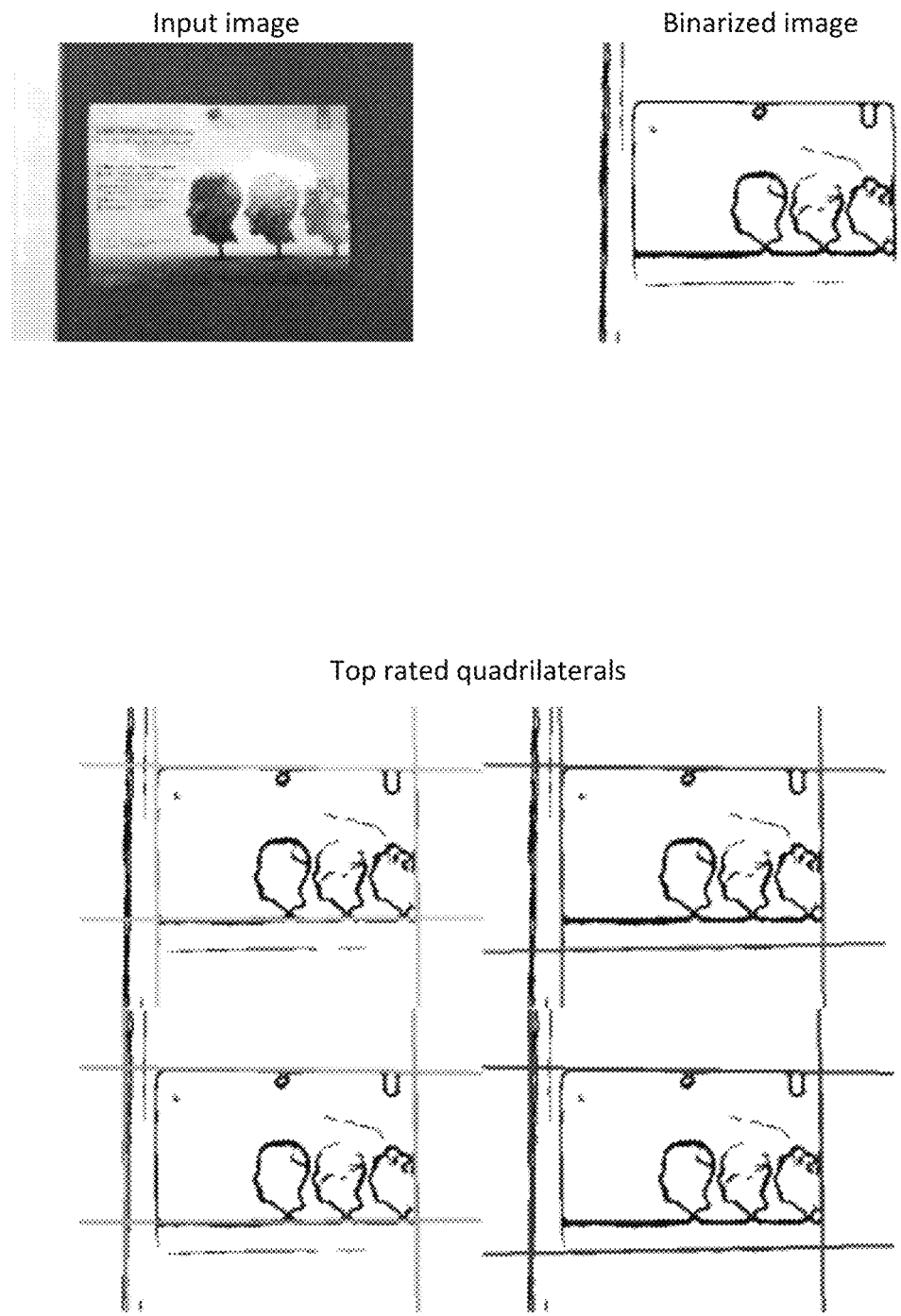
FIGS. 18, 19, and 20 each show a series of example images with top rated quadrilaterals, in accordance with an embodiment of the present disclosure.
Figure 19:
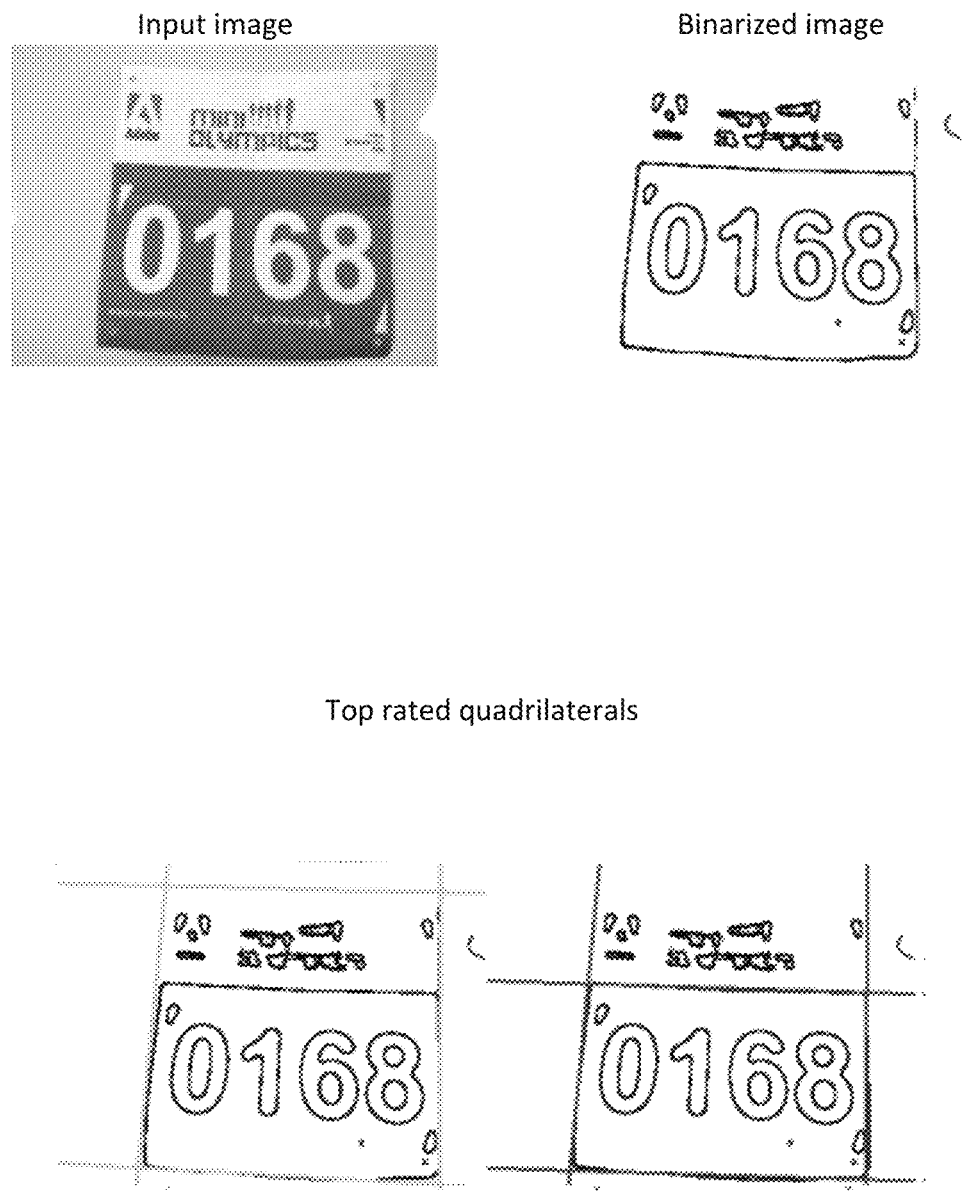
Figure 20:
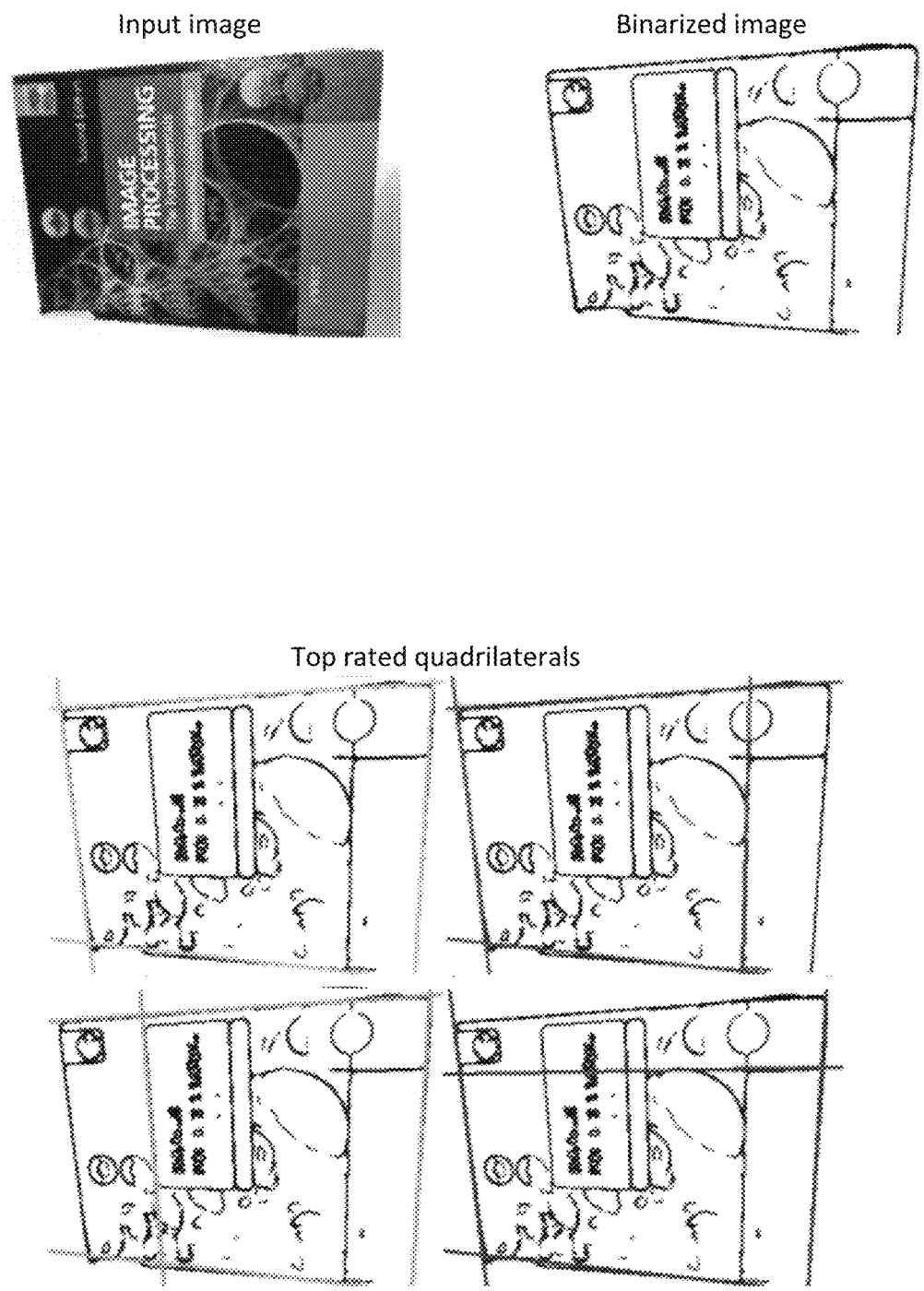

FIGS. 18, 19, and 20 each show a series of example images with the top-rated quadrilaterals computed according to the techniques discussed in this disclosure. Note that the number of top-rated quadrilaterals may vary based on the lines rated using the Hough transform and the quadrilateral rating.

Figure 21:
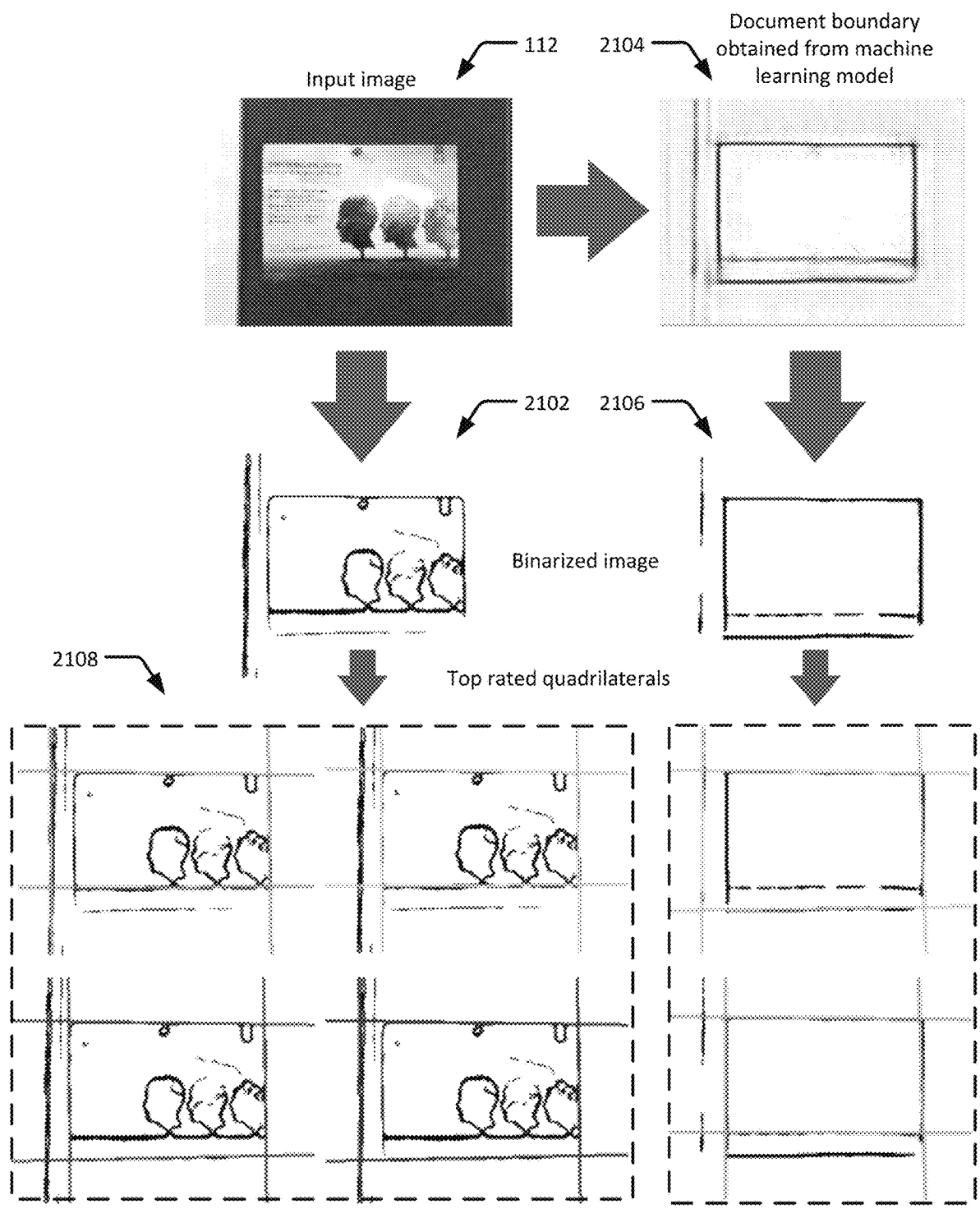
FIGS. 21, 22, 23, and 24 show example depictions of a method for determining a document boundary, in accordance with an embodiment of the present disclosure.

Referring again to FIG. 12, once the quadrilateral rating has been computed 1208, the document boundary can be determined 1110, as will be described in further detail below. FIG. 21 shows an example sequence of images during determination of the document boundary, in accordance with an embodiment of the present disclosure. An input image 114 is used to compute a first binarized gradient image 2102 as well as a document boundary 2104 obtained from the machine learning model 114. The document boundary 2104 is used to compute a second binarized gradient image 2106 using hysteresis binarization. The top four quadrilaterals of the first binarized gradient image 2102 are computed using the image processing algorithm described above. Similarly, the top two quadrilaterals of the second binarized gradient image 2106 are computed. The number of top-rated quadrilaterals varies with the number of lines computed by Hough transform algorithm. All the respective quadrilaterals 2108 are shown in FIG. 21.

From the quadrilaterals, neither the top most quadrilateral obtained from the first binarized gradient image 2102 nor the top most quadrilateral obtained from the second binarized gradient image 2106 has the correct document boundary. However, the results can be improved by analyzing all the top-rated quadrilaterals 2108 independently using a suitable image processing algorithm to find the best quadrilateral, such as follows.

Figure 22:
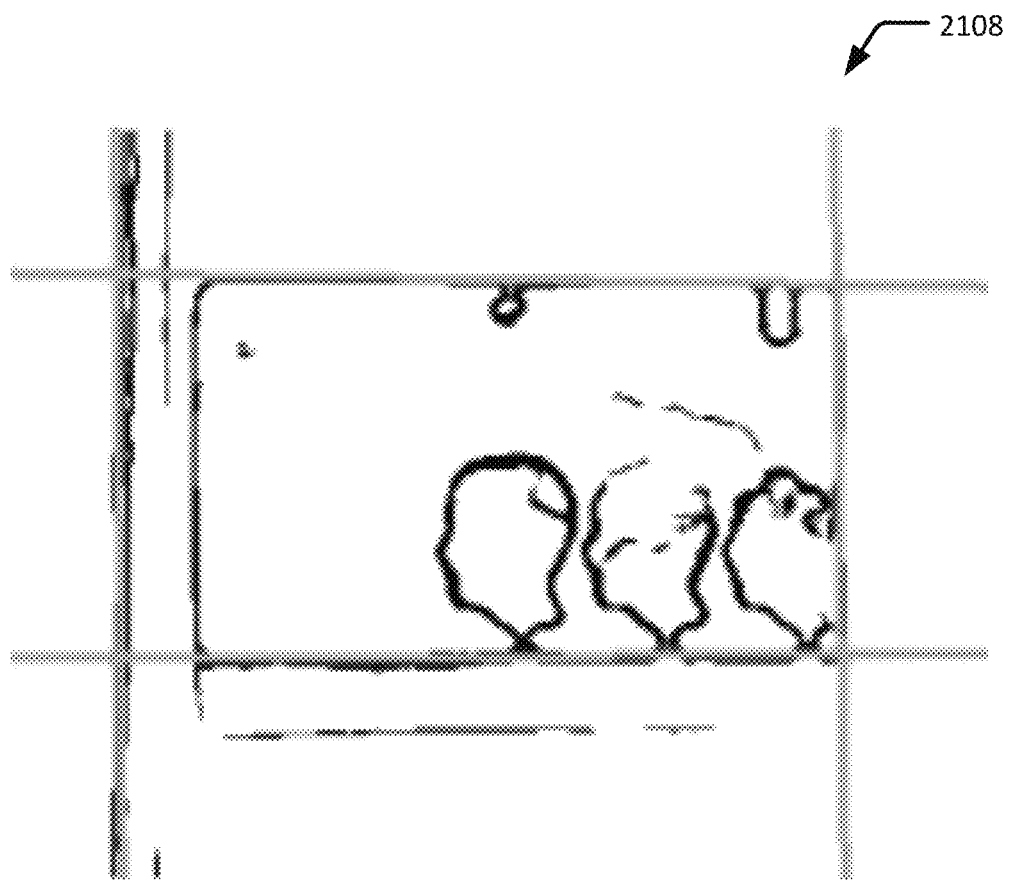
Figure 23:
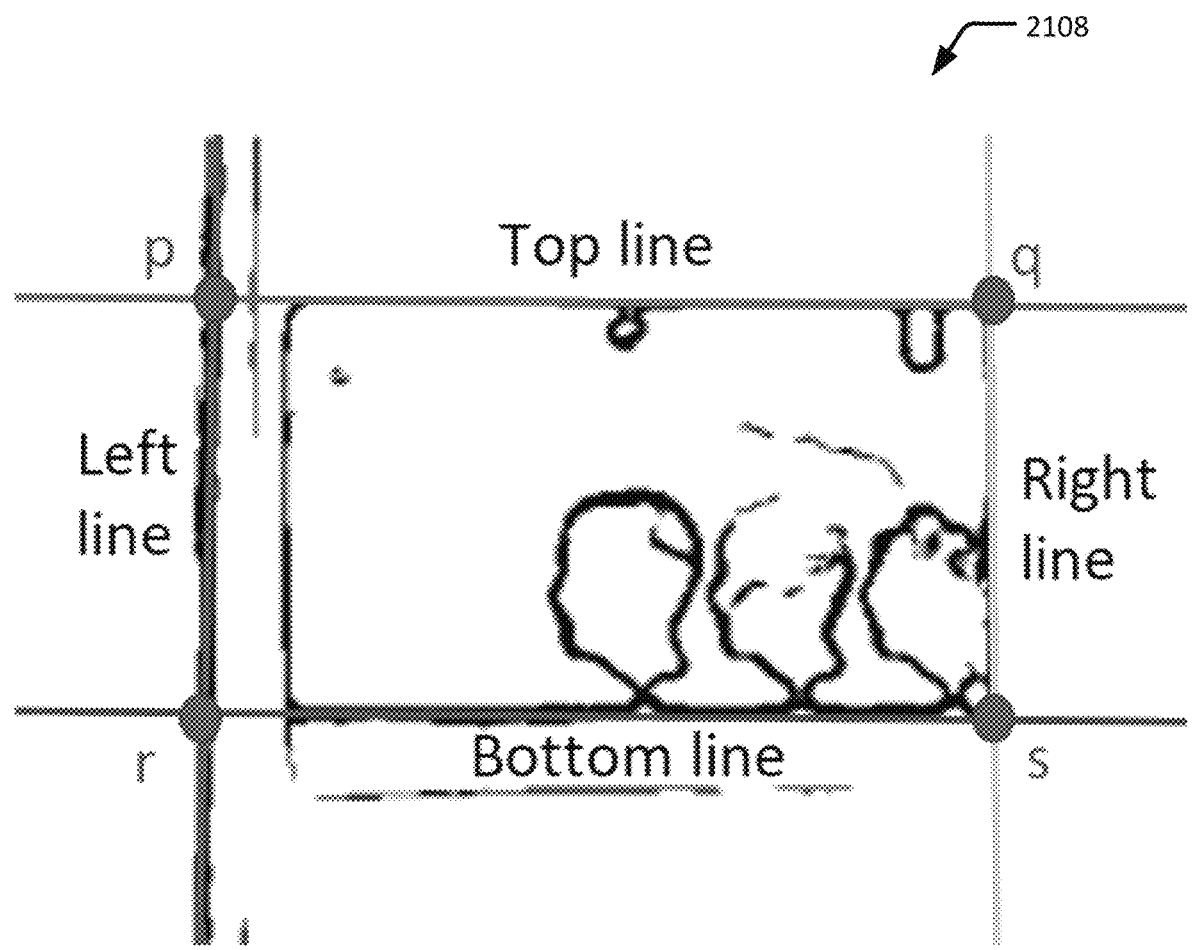
Figure 24:
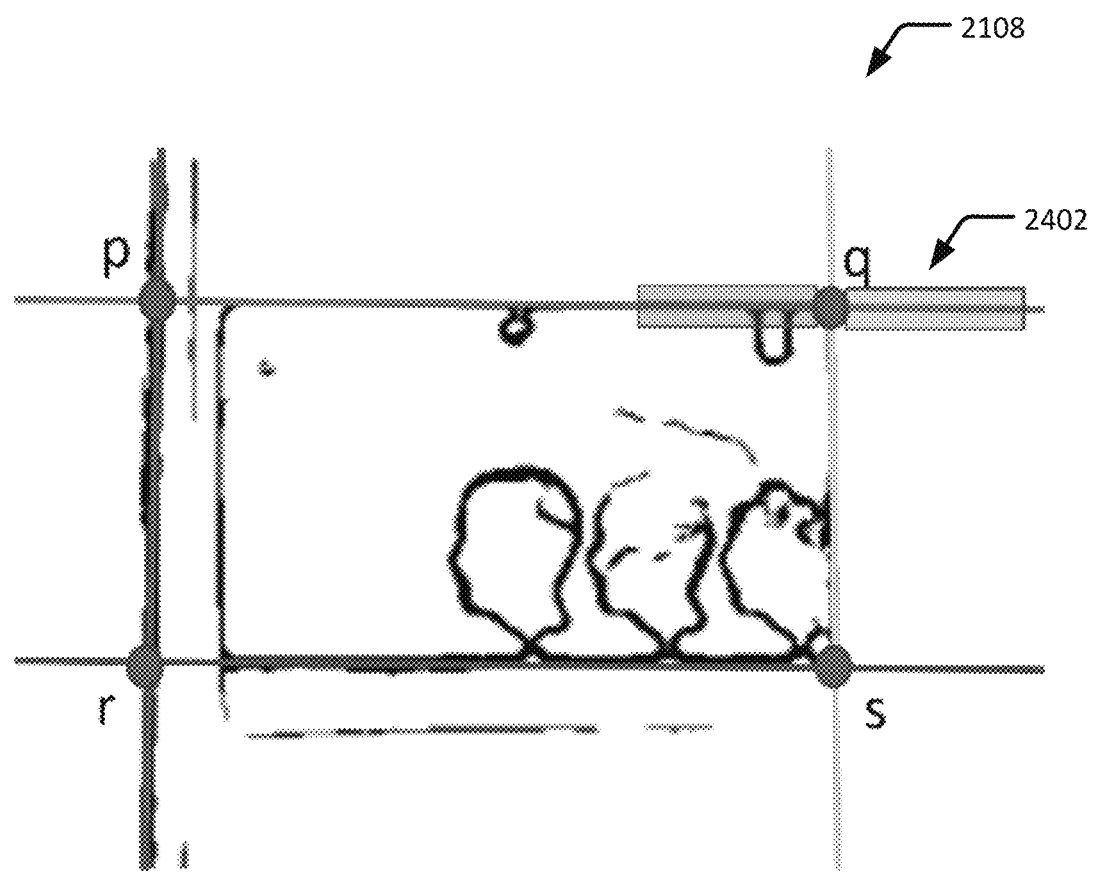

First, consider two binarized images, such as described above with respect to FIG. 21 and shown in FIG. 22. First and second sets of quadrilaterals are computed for the two binarized images, respectively. The number of quadrilaterals in each set is not necessarily the same. Then, for each quadrilateral in the first set, a score is computed based on the four corners p, q, r, and s, as shown in FIG. 23. Lines can be formed on the top (pq), right (qs), bottom (rs), and left (pr). For each of the four lines, consider a line segment 2402 from a point (e.g., point q) outside and along the line (e.g., line pq), as shown in FIG. 24. The size of the segment 2402 is determined empirically. For each point in the segment 2402, consider a window of size 5 (chosen empirically). The overlapping window region is indicated as the shaded region along the segment 2402. Next, count the number of black pixels (if any) in the window region. If the total number of black pixels in the window region is greater than a threshold value (chosen empirically), the point q is considered to have extended line segments toward the outside of the quadrilateral. Similarly, the number of black pixels (if any) in a corresponding window region inside and along the line is calculated to determine whether point q has extended line segments toward the inside of the quadrilateral. A quadrilateral score, which is initialized to 16, is decremented by one if there exist any extended line segments toward the outside and decremented by one if there does not exist any extended line segments toward the inside. The above computations are repeated for each line end points in the other three line segments of the quadrilateral to further adjust the quadrilateral score. The above computations are further repeated for each quadrilateral in the second set.

Once the score of each quadrilateral is computed, the quadrilaterals are sorted in descending order of their scores, and the quadrilateral with the highest score is selected as the final document boundary for the input image. If more than one quadrilateral has the same highest score and if all the quadrilaterals with highest score are from the same set, then select the quadrilateral with the highest rating as computed earlier. Otherwise, if the quadrilaterals with the highest score are from both sets, perform the following: a.) Consider the quadrilateral that has the highest score from the first set. b.) Consider the quadrilateral that has the highest score from the second set. c.) Compare the two quadrilaterals by checking if all the corresponding four corners of each are within a threshold region. The threshold value is computed empirically. d.) If the two quadrilaterals are within the threshold region, then they are very close, and the first quadrilateral is chosen as the final document boundary for the input image. e.) Otherwise, if the two quadrilaterals are not within the threshold region, then they are very distant, and the second quadrilateral is chosen as the final document boundary for the input image.

Figure 25:
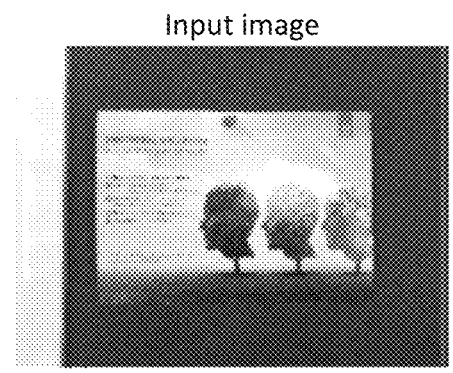
FIG. 25 shows several example images, in accordance with an embodiment of the present disclosure.
Figure 25:
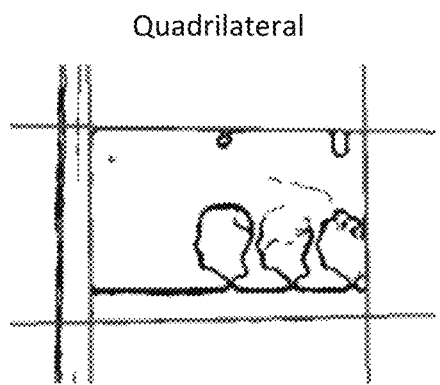
Figure 25:
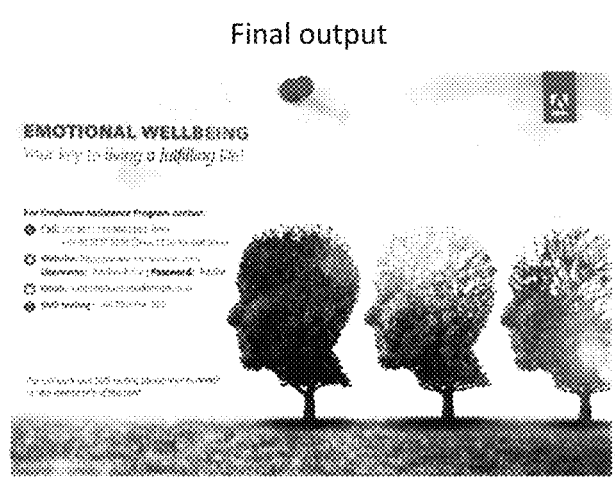

FIG. 25 shows examples of an input image of a document and a background, a quadrilateral representing the boundaries of the document in the input image, and a final output image of the document with the background beyond the document boundaries removed, in accordance with an embodiment of the present disclosure. The disclosed techniques show that a machine learning model can be used efficiently to compute the document boundary from an input image, that an image processing algorithm can be used to compute a number of quadrilaterals (as probable document boundaries) from an input image, and that an image processing algorithm can be used to compute the best quadrilateral from the quadrilaterals (which are computed from the machine learning model and the image processing technique) that best suites as the document boundary of an input image. The disclosed techniques solve the technical problem of real-time document boundary detection using a machine learning model that computes the boundary of an input image and a sophisticated image processing algorithm to compute a best quadrilateral as document boundary corresponding to an input image. Advantages of the disclosed techniques include easing a number of workflows by saving time for users as the disclosed techniques automatically compute the best quadrilateral as document boundary and less need for user interaction, as the document boundary detection accuracy in some cases is approximately 85%, and enhancing the user experience, as the correct document boundary is automatically detected from an input image.

Numerous embodiments will be apparent in light of the present disclosure, and features described herein can be combined in any number of configurations. One example embodiment provides, in a digital medium environment for processing digital images, a computer-implemented method of determining a document boundary in an input image. The method includes identifying, by at least one processor, lines representing the document boundary in the input image; rating, by the at least one processor, each of the lines to determine one or more highest-rated lines in the image; computing, by the at least one processor, a first set of quadrilaterals using the one or more highest-rated lines in the image; and determining, by the at least one processor, a document boundary based on the first set of quadrilaterals and further based on a second set of quadrilaterals computed using a convolutional neural network trained to identify document boundaries. In some cases, the method includes causing, by the least one processor, display of an output image via a display device, the output image including a representation of the document boundary. In some cases, identifying the lines representing the document boundary includes denoising, by the at least one processor, the input image using a median filter to produce a medial filtered image; computing, by the at least one processor, gradients from the median filtered image to produce a gradient image; enhancing, by the at least one processor, the gradient image using a histogram stretching algorithm; binarizing, by the at least one processor, the enhanced gradient image using hysteresis binarization algorithm to produce a binarized image; and applying, by the at least one processor, a Hough transform to the binarized image to identify the lines representing the document boundary in the input image. In some cases, the method includes filtering, by the at least one processor, each of the lines by merging nearby lines into a single line if a distance between the lines to be merged and an angle between the lines to be merged are both less than corresponding threshold values; sorting, by the at least one processor, the filtered lines based on their ratings in descending order; and determining, by the at least one processor, the three highest-rated lines on each side of the document in the image. In some cases, determining the document boundary includes for each quadrilateral in the first set of quadrilaterals, determining, by the at least one processor, opposite lines of the quadrilateral; computing, by the at least one processor, angles between two of the lines and a Y-axis; discarding, by the at least one processor, the respective quadrilateral if a difference between the angles is less than a threshold value; and repeating the determining, the computing, and the discarding for another two of the lines of the quadrilateral. In some such cases, the method includes computing, by the at least one processor, a rating for each of the quadrilaterals in the first and second sets of quadrilaterals based at least in part on a similarity between inside areas of the respective quadrilateral and a similarity between outside areas of the respective quadrilateral, wherein the document boundary is determined based on the rating of each quadrilateral. In some cases, the method includes training, by the at least one processor, the convolutional neural network based on at least one of a synthetic set of regular document types, a synthetic set of white-on-white and low contrast document types, a synthetic set of external parallel table edge types, and a real-world set of scanned documents. Another example embodiment provides a computer program product including one or more non-transitory machine-readable media having instructions encoded thereon that when executed by one or more processors cause the one or more computer processors to perform a process such as set forth in this paragraph.

Another example embodiment provides a system for determining a document boundary in an input image. The system includes at least one processor, and a storage operatively coupled to the at least one processor and for storing instructions that when executed by the at least one processor cause the at least one processor to identify lines representing the document boundary in the input image; rate each of the lines to determine one or more highest-rated lines in the image; compute a first set of quadrilaterals using the one or more highest-rated lines in the image; and determine a document boundary based on the first set of quadrilaterals and further based on a second set of quadrilaterals computed using a convolutional neural network trained to identify document boundaries. In some cases, the instructions include causing, by the least one processor, display of an output image via a display device, the output image including a representation of the document boundary. In some cases, identifying the lines representing the document boundary includes denoising, by the at least one processor, the input image using a median filter to produce a medial filtered image; computing, by the at least one processor, gradients from the median filtered image to produce a gradient image; enhancing, by the at least one processor, the gradient image using a histogram stretching algorithm; binarizing, by the at least one processor, the enhanced gradient image using hysteresis binarization algorithm to produce a binarized image; and applying, by the at least one processor, a Hough transform to the binarized image to identify the lines representing the document boundary in the input image. In some cases, the instructions include filtering, by the at least one processor, each of the lines by merging nearby lines into a single line if a distance between the lines to be merged and an angle between the lines to be merged are both less than corresponding threshold values; sorting, by the at least one processor, the filtered lines based on their ratings in descending order; and determining, by the at least one processor, the three highest-rated lines on each side of the document in the image. In some cases, determining the document boundary includes for each quadrilateral in the first set of quadrilaterals, determining, by the at least one processor, opposite lines of the quadrilateral; computing, by the at least one processor, angles between two of the lines and a Y-axis; discarding, by the at least one processor, the respective quadrilateral if a difference between the angles is less than a threshold value; and repeating the determining, the computing, and the discarding for another two of the lines of the quadrilateral. In some such cases, the instructions include computing, by the at least one processor, a rating for each of the quadrilaterals in the first and second sets of quadrilaterals based at least in part on a similarity between inside areas of the respective quadrilateral and a similarity between outside areas of the respective quadrilateral, wherein the document boundary is determined based on the rating of each quadrilateral. In some cases, the instructions include training, by the at least one processor, the convolutional neural network based on at least one of a synthetic set of regular document types, a synthetic set of white-on-white and low contrast document types, a synthetic set of external parallel table edge types, and a real-world set of scanned documents.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:
1. In a digital medium environment for processing digital images, a computer-implemented method of determining a document boundary in an input image, the method comprising:
    identifying, by at least one processor, lines representing the document boundary in the input image by:
        denoising the input image using a median filter to produce a median filtered image;
        computing gradients from the median filtered image to produce a gradient image;
        enhancing the gradient image using a histogram stretching algorithm; and binarizing the enhanced gradient image using hysteresis binarization algorithm to produce a binarized image;

rating, by the at least one processor, each of the lines to determine one or more highest-rated lines in the binarized image;

computing, by the at least one processor, a first set of quadrilaterals using the one or more highest-rated lines in the binarized image; and determining, by the at least one processor, a document boundary based on the first set of quadrilaterals and further based on a second set of quadrilaterals computed using a convolutional neural network trained to identify document boundaries.

2. The method of claim 1, further comprising causing, by the least one processor, display of an output image via a display device, the output image including a representation of the document boundary.

3. The method of claim 1, wherein identifying the lines representing the document boundary includes:

applying, by the at least one processor, a Hough transform to the binarized image.

4. The method of claim 1, further comprising:

filtering, by the at least one processor, each of the lines by merging nearby lines into a single line if a distance between the lines to be merged and an angle between the lines to be merged are both less than corresponding threshold values;

sorting, by the at least one processor, the filtered lines based on their ratings in descending order; and determining, by the at least one processor, the three highest-rated lines on each side of the document in the image.

5. The method of claim 1, wherein determining the document boundary includes:

for each quadrilateral in the first set of quadrilaterals, determining, by the at least one processor, opposite lines of the quadrilateral;

computing, by the at least one processor, angles between two of the opposite lines and a Y-axis;

discarding, by the at least one processor, the respective quadrilateral if a difference between the angles is less than a threshold value; and repeating the determining, the computing, and the discarding for another two of the lines of the quadrilateral.

6. The method of claim 5, further comprising:

computing, by the at least one processor, a rating for each of the quadrilaterals in the first and second sets of quadrilaterals based at least in part on a similarity between inside areas of the respective quadrilateral and a similarity between outside areas of the respective quadrilateral, wherein the document boundary is determined based on the rating of each quadrilateral.

7. The method of claim 1, further comprising training, by the at least one processor, the convolutional neural network based on at least one of a synthetic set of regular document types, a synthetic set of white-on-white and low contrast document types, a synthetic set of external parallel table edge types, and a real-world set of scanned documents.

8. The method of claim 1, wherein the binarized image is a first binarized image, and wherein the method further comprises:

computing, using a machine learning model, a second binarized image from a document boundary of the input image using hysteresis binarization, wherein the second set of quadrilaterals is based on the second binarized image; and assigning a first score to a first quadrilateral in the first set of quadrilaterals based on lines connecting four corners of the first quadrilateral, and a second score to a second quadrilateral in the second set of quadrilaterals based on lines connecting four corners of the second quadrilateral, wherein the document boundary is determined using the first quadrilateral if the first score is higher than the second score, and using the second quadrilateral otherwise.

9. A computer program product including one or more non-transitory machine-readable media having instructions encoded thereon that when executed by at least one processor causes a process for determining a document boundary in an input image to be carried out, the process comprising:

identifying lines representing the document boundary in the input image;

rating each of the lines to determine one or more highest-rated lines in the image;

computing a first set of quadrilaterals using the one or more highest-rated lines in the image; and determining a document boundary based on the first set of quadrilaterals and further based on a second set of quadrilaterals computed using a convolutional neural network trained to identify document boundaries by:

for each quadrilateral in the first set of quadrilaterals, determining opposite lines of the quadrilateral;

computing angles between two of the opposite lines and a Y-axis; and discarding the respective quadrilateral from the first set of quadrilaterals if a difference between the angles is less than a threshold value.

10. The computer program product of claim 9, the process further comprising causing display of an output image via a display device, the output image including a representation of the document boundary.

11. The computer program product of claim 9, wherein identifying the lines representing the document boundary includes:

denoising the input image using a median filter to produce a median filtered image;

computing gradients from the median filtered image to produce a gradient image;

enhancing the gradient image using a histogram stretching algorithm;

binarizing the enhanced gradient image using hysteresis binarization algorithm to produce a binarized image; and applying a Hough transform to the binarized image to identify the lines representing the document boundary in the input image.

12. The computer program product of claim 9, the process further comprising:

filtering each of the lines by merging nearby lines into a single line if a distance between the lines to be merged and an angle between the lines to be merged are both less than corresponding threshold values;

sorting the filtered lines based on their ratings in descending order; and determining the three highest-rated lines on each side of the document in the image.

13. The computer program product of claim 9, wherein determining the document boundary includes:

repeating the determining, the computing, and the discarding for another two of the lines of the quadrilateral.

14. The computer program product of claim 9, the process further comprising:

computing a rating for each of the quadrilaterals in the first and second sets of quadrilaterals based at least in part on a similarity between inside areas of the respective quadrilateral and a similarity between outside areas of the respective quadrilateral, wherein the document boundary is determined based on the rating of each quadrilateral.

15. The computer program product of claim 9, the process further comprising training the convolutional neural network based on at least one of a synthetic set of regular document types, a synthetic set of white-on-white and low contrast document types, a synthetic set of external parallel table edge types, and a real-world set of scanned documents.

16. A system for determining a document boundary in an input image, the system comprising:
at least one processor; and
a storage operatively coupled to the at least one processor and for storing instructions that when executed by the at least one processor cause the at least one processor to identify lines representing the document boundary in the input image by:
   denoising the input image using a median filter to produce a median filtered image;
   computing gradients from the median filtered image to produce a gradient image;
   enhancing the gradient image using a histogram stretching algorithm;
   binarizing the enhanced gradient image using hysteresis binarization algorithm to produce a binarized image; and
   applying a Hough transform to the binarized image;
rate each of the lines to determine one or more highest-rated lines in the binarized image;
compute a first set of quadrilaterals using the one or more highest-rated lines in the binarized image; and
determine a document boundary based on the first set of quadrilaterals and further based on a second set of quadrilaterals computed using a convolutional neural network trained to identify document boundaries.

17. The system of claim 16, the instructions further causing display of an output image via a display device, the output image including a representation of the document boundary.

18. The system of claim 16, the instructions further causing the at least one processor to:
filter each of the lines by merging nearby lines into a single line if a distance between the lines to be merged and an angle between the lines to be merged are both less than corresponding threshold values;
sort the filtered lines based on their ratings in descending order; and
determine the three highest-rated lines on each side of the document in the image.

19. The system of claim 16, wherein determining the document boundary includes:
for each quadrilateral in the first set of the quadrilaterals, determining opposite lines of the quadrilateral;
computing angles between two of the opposite lines and a Y-axis;
discarding the respective quadrilateral if a difference between the angles is less than a threshold value; and
repeating the determining, the computing, and the discarding for another two of the lines of the quadrilateral.

20. The system of claim 16, the instructions further causing the at least one processor to train the convolutional neural network based on at least one of a synthetic set of regular document types, a synthetic set of white-on-white and low contrast document types, a synthetic set of external parallel table edge types, and a real-world set of scanned documents.

* * * * *